US012661283B2

(12) United States Patent
Saucier

(10) Patent No.: US 12,661,283 B2
(45) Date of Patent: Jun. 23, 2026

(54) VEHICLE ACCESS RAMP

(71) Applicant: MPOWER MOBILITY, INC, Tarzana, CA (US)

(72) Inventor: Stanton David Saucier, Tarzana, CA (US)

(73) Assignee: MPOWER MOBILITY, INC, Tarzana, CA (US)

( * ) Notice: Subject to any disclaimer, the term of this patent is extended or adjusted under 35 U.S.C. 154(b) by 1300 days.

(21) Appl. No.: 17/402,510

(22) Filed: Aug. 14, 2021

(65) Prior Publication Data

US 2022/0047436 A1 Feb. 17, 2022

Related U.S. Application Data

(60) Provisional application No. 63/065,844, filed on Aug. 14, 2020.

(51) Int. Cl.
*A61G 3/06* (2006.01)
*B60P 1/43* (2006.01)
*F16B 1/00* (2006.01)

(52) U.S. Cl.
CPC .............. *A61G 3/061* (2013.01); *B60P 1/43* (2013.01); *F16B 1/00* (2013.01); *Y10T 403/59* (2015.01); *Y10T 403/60* (2015.01)

(58) Field of Classification Search
CPC ... A61G 3/06; A61G 3/061; B60P 1/43; B60P 1/435; Y10T 403/59; Y10T 403/591;

Y10T 403/593; Y10T 403/595; Y10T 403/599; Y10T 403/60; Y10T 403/602; Y10T 403/608; F16B 1/00
See application file for complete search history.

(56) References Cited

U.S. PATENT DOCUMENTS

| | | | | |
|---|---|---|---|---|
| 4,664,584 A | * | 5/1987 | Braun ..................... | A61G 3/062 |
| | | | | 187/217 |
| 4,902,156 A | * | 2/1990 | Deisler ..................... | H04N 1/06 |
| | | | | 403/322.3 |
| 5,234,311 A | * | 8/1993 | Loduha, Jr. .............. | A61G 3/06 |
| | | | | 414/921 |

(Continued)

FOREIGN PATENT DOCUMENTS

| | | | |
|---|---|---|---|
| KR | 101466629 B1 | * 12/2014 | |
| WO | WO-2005074406 A2 | * 8/2005 | ............. A61G 3/062 |

*Primary Examiner* — Jonathan P Masinick
(74) *Attorney, Agent, or Firm* — AP Patents; Alexander Pokot

(57) ABSTRACT

A ramp assembly comprises a support defining each of a vertical axis and a horizontal axis, a ramp being coupled to the support and being configured to support an passenger thereon. An optional actuator mechanism may be coupled to at least one of the support, the ramp, a power source and a controller, the actuator mechanism configured, in a response to a control signal from the controller or in a response to a manual force, to rotate the ramp about the vertical axis between a stowed position and a deployed position or rotate the ramp about the horizontal axis between the deployed position and a ground engaging position. The actuator may comprise a motor with a gearbox and two gears to rotate the ramp about the vertical axis. The actuator may comprise a linear actuator to rotate the ramp about the horizontal axis.

18 Claims, 21 Drawing Sheets

(56)                References Cited

U.S. PATENT DOCUMENTS

| | | | | |
|---|---|---|---|---|
| 6,010,298 | A * | 1/2000 | Cohn ..................... | A61G 3/061 |
| | | | | 414/921 |
| 6,186,733 | B1 * | 2/2001 | Lewis .................... | B60P 1/431 |
| | | | | 414/921 |
| 6,599,079 | B1 * | 7/2003 | Hermanson .............. | A61G 3/06 |
| | | | | 414/921 |
| 6,866,464 | B2 * | 3/2005 | Kellogg ................... | B60P 1/43 |
| | | | | 414/537 |
| 7,870,630 | B2 * | 1/2011 | Johnson ................. | B60P 1/433 |
| | | | | 14/71.1 |
| 8,051,691 | B2 * | 11/2011 | Gallo ................... | E05B 47/023 |
| | | | | 292/216 |
| 8,631,528 | B1 * | 1/2014 | Johnson ................. | B60P 1/433 |
| | | | | 14/71.1 |
| 8,876,174 | B2 * | 11/2014 | Motherwell ........... | B62K 19/40 |
| | | | | 292/195 |
| 8,882,161 | B2 * | 11/2014 | Willing ................... | E05C 3/24 |
| | | | | 292/216 |
| 9,022,434 | B2 * | 5/2015 | Crippen .............. | H05K 7/1487 |
| | | | | 292/194 |
| 10,195,977 | B2 * | 2/2019 | Bettcher, III ............ | B60P 1/44 |
| 10,272,003 | B2 * | 4/2019 | Zindler ................ | B62D 33/027 |
| 10,676,974 | B2 * | 6/2020 | Wojdyla ................ | A61G 3/062 |
| 10,945,896 | B1 * | 3/2021 | Saucier ................... | F16H 25/14 |
| 11,472,326 | B1 * | 10/2022 | Nageshkar ............. | B60P 1/435 |
| 11,491,059 | B2 * | 11/2022 | Saucier .................. | B60P 1/438 |
| 11,951,050 | B2 * | 4/2024 | Bartos .................... | B60P 1/438 |
| 11,963,913 | B2 * | 4/2024 | Huisl ...................... | B60P 1/436 |
| 12,344,319 | B1 * | 7/2025 | Murray ................. | B62D 25/20 |
| 2014/0166826 | A1 * | 6/2014 | Liao .................... | F16M 11/041 |
| | | | | 403/327 |

* cited by examiner

VEHICLE ACCESS RAMP

CROSS-REFERENCE TO RELATED APPLICATIONS

This nonprovisional patent application is related to and claims benefit of priority from U.S. Provisional Patent Application Ser. No. 63/065,844 filed on Aug. 14, 2020, the entire contents of which are hereby incorporated by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

The subject matter relates to ramps. It may relate to manually and power operated wheelchair access ramps. It may further relate to manually and power operated wheelchair access ramps installed on low floor vehicles to accommodate passengers with limited mobility. It may further relate to a latching device configured to latch the ramp during use.

BRIEF DESCRIPTION OF THE DRAWINGS

The accompanying drawings are incorporated in and constitute part of the specification and illustrate various embodiments. In the drawings.

DETAILED DESCRIPTION

Figures 1, 2, 3:
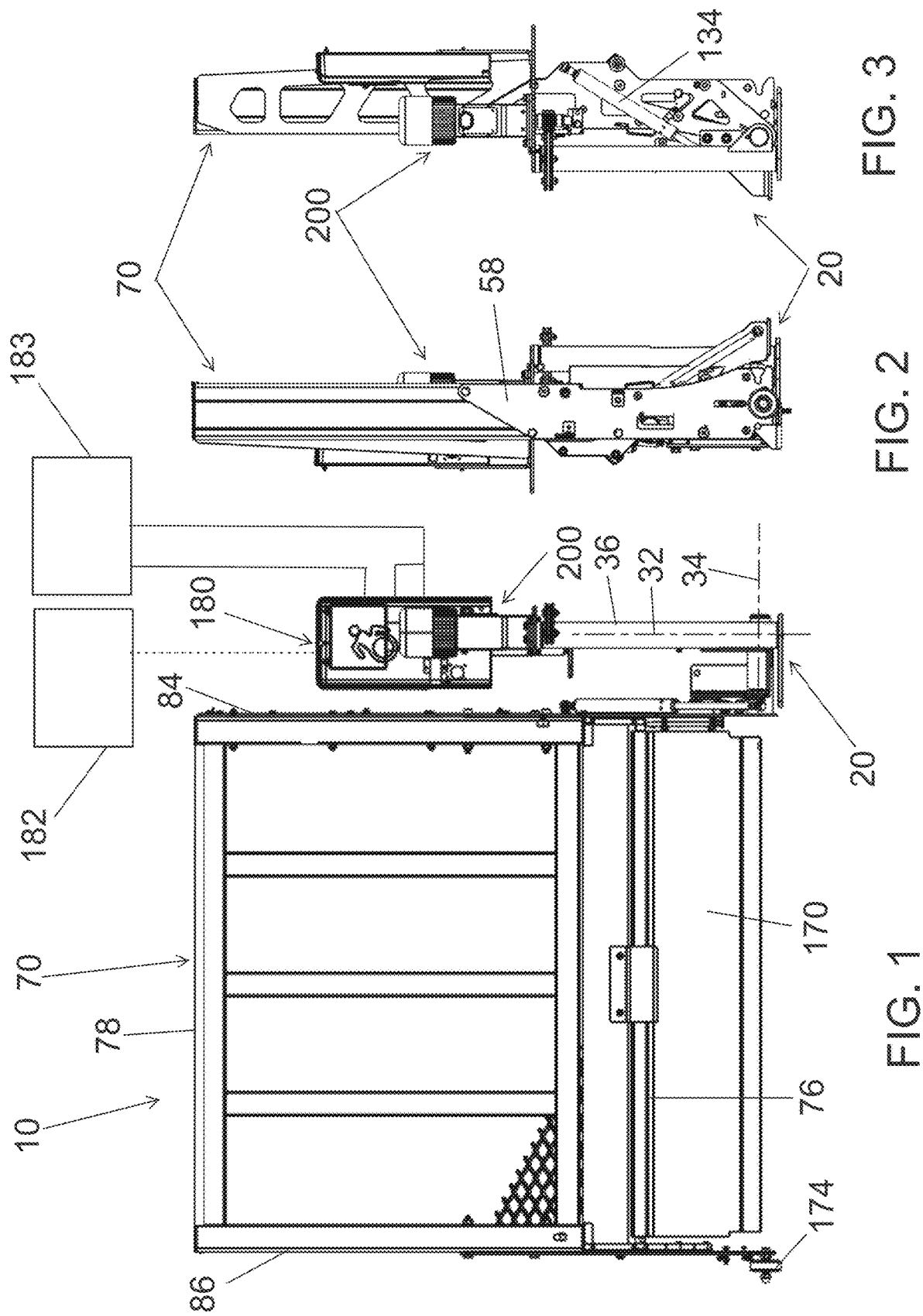
FIG. 1 illustrates an elevation view of a ramp assembly.
FIG. 2 illustrates an elevation view of the ramp assembly.
FIG. 3 illustrates an elevation view of the ramp assembly.

Prior to proceeding to the more detailed description of the present subject matter, it should be noted that, for the sake of clarity and understanding, identical components which have identical functions have been identified with identical reference numerals throughout the several views illustrated in the drawing figures.

Anywhere the term "comprising" is used, embodiments and components "consisting essentially of" and "consisting of" are expressly disclosed and described herein." Furthermore, the verb "comprise" may be understood in the sense of including or having.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

It is to be understood that the singular forms "a," "an," and "the" include plural referents unless the context clearly dictates otherwise. Thus, for example, reference to "a surface" includes reference to one or more of such surfaces.

The verb "may" is used to designate optionality/noncompulsoriness. In other words, something that "may" can, but need not.

The verb "rotate" may also denote the verb "pivot".

Although connections between many components have been illustrated as mechanical connections comprising screws, nuts, washers, retaining rings and the like, other connections may be used. Components may be connected with adhesives. Components may be welded together. Components may be designed with interlocking tabs and recesses for a fastener-free connection.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user (s), and end user(s). The meaning of "user", or any similar term, as used herein, should not be otherwise inferred or induced by any pattern(s) of description, embodiments, examples that may be provided in the present disclosure.

Before elucidating the subject matter shown in the Figures, the present disclosure will be first described in general terms.

General Description

The ramp assembly may be used in a combination with a vehicle. The ramp assembly comprises a support, and a ramp. The support defines each of a vertical axis and a horizontal axis during operation of the ramp assembly. The vertical axis may be referred to as a first axis and the horizontal axis may be referred to as a second axis. When the ramp assembly is to be used with the vehicle, the support will be mounted to a vehicle structure inside a vehicle interior. The support may be attached directly to a floor of the vehicle. The support may be attached directly to a wall of the vehicle. The support may be indirectly mounted to either the floor or the wall with intervening mounting brackets. The support may be attached, either directly or indirectly, to both the floor and the wall of the vehicle. The support comprises a stationary portion and a movable portion that rotates about the stationary portion. The stationary portion may be referred to as a mount. The mount comprises a base portion that is fixed to the vehicle structure, being one of the floor, the wall and both. The mount also comprises a member that upstands on the base. The member may have an elongated shape. The elongated member may be a tubular member. The elongated member may be a rod-shaped member. The elongated member defines the vertical axis. The movable portion may comprise a tubular member that receives the elongated member therewithin and that rotates about the elongated member. In other words, the vertical axis may define a rotation axis in a vertical plane when the ramp assembly is installed for use. At least one bearing may be provided to facilitate rotation or pivoting of the tubular member. The support also comprises another mount that is attached to the movable portion and another tubular member that is configured to rotate the ramp about the horizontal axis when the ramp assembly is installed for use.

During use, the ramp is coupled to another tubular member. The ramp may be fastened to the another tubular member. The ramp may be welded to the another tubular member. In other words, the ramp is attached to the support during operation of the ramp assembly. The support may entirely support the weight of the ramp during operation. During operation, the ramp is rotated on the support about the vertical axis between a stowed position and a deployed position, as two terminal positions. In the stowed position, the ramp is inside the vehicle interior, being disposed in a vertical plane and generally perpendicular to one wall of the vehicle. Such one wall may be a side wall. In such position, the ramp may be stowed adjacent a seat.

In the stowed position, the ramp allows boarding into and alighting from the vehicle by mobile passengers of the vehicle. In the deployed position, the ramp is positioned within or near an opening in the side wall. Such opening may be a door portal. The door portal may be a side door portal. The door portal may be a read door portal. During operation, the ramp is also rotated about the horizontal axis between the deployed position and a ground engaging position for the purpose of enabling a passenger to board and alight the vehicle. In the ground engaging position, an inner end of the ramp is generally aligned with the vehicle floor and the outer end of the ramp is in a contact with a ground. In other words, the ramp rotates between a vertical position and an inclined position, thus bridging a height deference between the vehicle floor and the ground. When the ramp is rotated into the ground engaging position, the ramp provides an inclined surface for a passenger to board the vehicle and alight from the vehicle. In other words, the ramp is configured to support the passenger thereon when being in the ground engaging position. The passenger may be of a full mobility. The passenger may be of a limited mobility. The passenger with a limited mobility may be seated in a wheelchair. The passenger may be referred to as an occupant of the vehicle. When the ramp is rotated into the ground engaging position, the ramp may provide an inclined surface to load the vehicle with cargo or unload the cargo from the vehicle.

Although the ramp is being illustrated in various figures with the support disposed on a right hand side of the ramp with the ramp rotating in a counterclockwise wise direction from folded position to the deployed position, the support may be disposed on the left side of the ramp so that the ramp configured to rotate in a clockwise wise direction from folded position to the deployed position The ramp may be inclined at an angle sufficient for the passenger with the limited mobility to board the vehicle and alight therefrom. In some countries, the inclined angle is mandated by regulations. A length of the ramp depends on the inclined angle. The inclined angle may be also dependent on the type of the vehicle. When the vehicle has a kneeling type suspension, the height difference between the vehicle floor and ground decreases during boarding and alighting process. Thus, in this application, the length of the ramp may be reduced as compared to a length of the ramp installed on vehicles without kneeling type suspension. The length of the ramp may also depend on a height of the opening where the ramp may be sized close to the height of the opening.

The ramp may comprise a one-piece construction. The ramp may comprise two ramp portions that are hinged therebetween. When the ramp comprises two ramp portions, an inner ramp portion (can be also referred to as a first ramp portion) is secured to the support. The outer ramp portion (can be also referred to as a second ramp portion) moves, at the hinge, between a folded position where the outer ramp portion being disposed in a surface-to-surface facing arrangement with the inner ramp portion and an unfolded position where the outer ramp portion being disposed in an end-to-end facing arrangement with the inner ramp portion. When unfolded, the inner and outer ramp portions provide the above described surface. When ramp comprises two ramp portions, the effective length of the ramp between the inner end of the inner ramp portion and the outer end of the outer ramp portion being in the ground engaging position increases to accommodate inclined angle. It would be understood that such effective length of the ramp will be greater than a height of the opening, thus necessitating folding and unfolding of the ramp.

The ramp assembly, as described above may be manually pivoted between the stowed and deployed position and may be further pivoted between the deployed and the ground engaging positions.

The ramp assembly may comprise an actuator mechanism. The actuator mechanism, when provided, is configured to be coupled to the support, the ramp, and a power source. The actuator mechanism may be also coupled to a controller. The actuator mechanism may be configured, in a response to a control signal from the controller or in a response to a manual force, to rotate the ramp about the vertical axis between stowed and deployed positions. The controller may be provided as a component of the ramp assembly. The controller may be incorporated into a pendant that is operated by a user of the ramp assembly. The user may be the passenger of the vehicle. The user may be a driver of the vehicle. The controller circuit and functionality may be integrated into a vehicle controller. When controller is provided as a component of the ramp assembly, the ramp assembly only requires a structural mounting connection and an electrical connection to the power supply of the vehicle. Since in most vehicles, the power supply is a battery, the ramp assembly may be adapted with a battery, being independent from the vehicle battery so that the ramp assembly is provided as a complete module to be simply attached to the vehicle structure. The actuator mechanism may be designed (configured), in a response to a control signal from the controller or in a response to a manual force, to rotate the ramp about the horizontal axis between the deployed position and the ground engaging position. The actuator mechanism may be configured, in a response to a control signal from the controller or in a response to a manual force, to rotate the ramp about the vertical axis between the stowed position and the deployed position and also rotate the ramp about the horizontal axis between the deployed position and the ground engaging position.

The actuator mechanism, when provided, comprises an actuator. The actuator may be one of an electric actuator, a pneumatic actuator, a hydraulic actuator and any combinations thereof.

When the actuator mechanism is configured to rotate the ramp about the vertical axis between the stowed position and at least the deployed position, the actuator mechanism may further comprise a driving component that is coupled to the actuator and a driven component that is coupled, either directly or indirectly, to the ramp. Each of the driving component and a driven component may be a gear so as to transfer power from the driving component to the driven component by way of meshed gear teeth. Each gear may be a spur gear. Each gear may be a bevel gear. Each of the driving component and a driven component may be manufactured from an elastomeric material to transfer power from the driving component to the driven component by way of friction between contacting surfaces of the driving and driven components.

The electric actuator may comprise an electric motor and a gearbox. The electric motor and the gearbox may be mounted in a stationary position. The gearbox is coupled to the output shaft of the motor. The gearbox may be a planetary gearbox. The planetary gearbox may comprise a ratio of planetary reduction selected to manually overcome the actuator (motor) and manually rotate the ramp. In view of this, the user may manually rotate the ramp about the vertical axis between deployed and stowed positions by overcoming meshed gears within the planetary gearbox. In other words, the user may "back-drive" the actuator. The actuator mechanism may be designed so that the ramp is rotated about the vertical axis past the deployed position to be disposed external to the vehicle side wall. To do so, the driving and driven components are sized to rotate, during operation, the ramp about the vertical axis with a total angle of rotation being greater than ninety (90) degrees. Such total angle of rotation may be at least one hundred and eighty (180) degrees. In this position, mobile passengers may board into and alight from the vehicle without the ramp being in the stowed position.

When the actuator mechanism is designed (configured) to rotate the ramp about the horizontal axis between the deployed position and the ground engaging position, the actuator may be of a linear actuator type. Furthermore, such linear actuator may comprise an AC or DC motor at one end of an actuator housing, a lead screw that is mounted within the actuator housing for a rotation and that is coupled with gears to the output shaft of the actuator motor and a driving nut with an internal thread that translates on the lead screw upon rotation thereof. The driving nut moves a movable portion, a main rod shaft, in and out. Thus, a free end of the main rod shaft reciprocally extends from and retracts into the actuator housing. Such linear actuator may be manufactured under model L28 by Linak of Denmark. The motor end of the linear actuator is rotationally or rotationally mounted to a support component. The free end of the main rod shaft may be coupled to the ramp by way of a retaining pin and does not move in a relationship to the ramp during the rotational movement thereof. When the ramp comprises two ramp portions the free end of the main rod shaft is coupled to the inner ramp portion.

Thus, in view of the above, the ramp assembly may be designed to rotate, with an actuator mechanism, the ramp about the vertical axis only, about the horizontal axis only and about both the vertical and horizontal axis.

When the ramp assembly is designed to rotate, with the actuator, the ramp about the horizontal axis, the ramp assembly may comprise a release mechanism configured to selectively couple and decouple the movable portion from the ramp and enable a manual rotation of the ramp between the deployed position and the ground engaging position. Such release mechanism may comprise a track on one a side of the ramp, a sliding portion that reciprocally slides within the track, a recess in the track, a pin engaged within the recess, the pin extending outwardly from the side of the ramp, and a knob connected to a free end of the pin, where the knob is being manually operable to selectively move the pin away from the recess and allowing the free end of the movable portion to slide along the one side of the ramp and to return the pin into an engagement with the recess and preventing the movable portion to slide along the one side of the ramp. When the ramp comprises two ramp portions with the free end of the main rod shaft being coupled to the inner ramp portion, the release mechanism is also coupled to inner ramp portion.

The design may be such that the device goes "over-center" when the ramp is in vertical plane, either in stowed or deployed positions. The reason for this is that given the "lost motion" designed into the end of travel on the fold actuator (the feature that opens the stow lock hook upon selection of the "unfold" or "lower" command), the ramp is essentially "loose" when folded and, therefore may rattle about while in transit. By allowing the counter balance device to go "over-center", the "loose" is compensated for such that the ramp is held more securely in the folded position and cannot rattle about.

The linear actuator may comprise a stroke control device to control actuator stroke at full extension and/or full retraction. Such stroke control device may be one of a limit switch, a potentiometer, an encoder and any combinations thereof. The limit switch may be an internal or external limit switch. The limit switch may comprise one of an electro-mechanical switch, a magnetic proximity switch and a rotary cam.

The ramp assembly may also comprise a counterbalance device to force the ramp into an overcenter position, thus relieving forces acting onto the actuator designed (config-ured) to rotate the ramp about the horizontal axis between the deployed position and the ground engaging position. The counter balance device may be a form of energy storage device (mechanical spring, pneumatic charge or perhaps a counterweight). Such counterbalance device may comprise a damper. The damper may be pneumatically or hydrauli-cally operable. The damper may comprise a gas spring. The "damper" may be referred to a device that manages the rate at which energy is released from the counterbalance device. Accordingly, in addition to pneumatic or hydraulic means of damping, it may be also damping by way of a mechanical friction.

When the ramp comprises two ramp portions, the ramp assembly may comprise a tension device to control unfold-ing movement of the two ramp sections and, more particu-larly, unfolding movement of the outer ramp portion since the actuator is coupled to the inner ramp portion. Such tension device may comprise a spring on the outer ramp portion and a cable. One end of the cable is coupled to the spring and another end of the cable is connected to an inner ramp portion. Pulleys may be provided on the inner and outer ramp portions to route the cable within the ramp assembly. Cable may partially comprise a chain to overcome small bend radii within the ramp assembly. When cable comprises a chain, the pulley comprises a sprocket sized and shaped to operatively mesh with the chain. As the ramp unfolds, the spring tensions and forces the outer ramp portion to move away from the inner ramp portion in a controlled manner without contacting the ground before the inner ramp portion is completely rotated. At the same time, the main rod shaft extends from the actuator housing. Since, the rotate point of the actuator housing is disposed rearward of the horizontal axis, the extension of the main rod shaft causes the inner ramp portion to rotate into the ground engaging position, as the inner and outer ramp portions unfold.

When the ramp comprises two ramp portions, the ramp assembly may also comprise a fold latch assembly to latch the outer ramp portion to the inner ramp portion when the ramp is folded in the deployed and stowed positions. Such fold latch assembly may comprise a fold latch lever rota-tionally connected to the inner ramp portion and a target connected to the outer ramp portion. The fold latch lever may have an edge notch adjacent one end edge and an inclined edge surface in the one end edge, thus defining a hook-shaped portion of the fold latch lever. Both the fold latch lever and the target may be connected to an edge surface of the respective ramp portion. Furthermore, the fold latch lever may be connected to the free end of the main rod shaft so that initial extension of the main rod shaft lifts the fold latch lever away from the target before the main rod shaft forces the inner ramp portion to rotate about the horizontal axis. To achieve this, the retaining pin, that the fold latch lever and the main rod shaft are attached to, is allowed to move linearly within a mounting slot during an initial phase of the unfolding motion. The slot is stationary and disposed on the inner ramp portion by way of a bracket. During operation, the retaining pin is disposed at the bottom end of the slot and is moved by the main rod shaft along the length of the slot to reach the top end of the slot. When the retaining pin reaches the top end of the slot, the fold latch lever is already lifted from the target. Furthermore, when the rotate shaft reaches the top end of the slot, continuing extension of the main rod shaft causes rotating action of the inner ramp portion from the deployed position toward the ground engaging position. In view of the above, the position of retaining pin and the free end of the main rod shaft is fixed in a relationship to the inner ramp portion when the rotate shaft reaches the top of the slot. Thus, the free end of the main rod shaft is engaged with the inner ramp portion. When the actuator is commanded through the controller to return the outer ramp portion and inner ramp portion into deployed position and when the outer ramp portion and inner ramp portion are folded against one another, the target first con-tacts the inclined edge surface of the fold latch lever and rotates the fold latch lever upwardly. The inclined edge may be a curved edge. When the folding motion is completed, the spring biases the fold latch lever into the latched position. The slot may comprise a pair of slots that are spaced apart from each other to ease the latching and unlatching motion of the fold latch lever and at least prevent if not eliminate any bending of the rotate shaft during folding and unfolding movements.

In view of the above, it will be understood that the fold latch assembly easily converts folding/unfolding movement between powered and manual modes. In view of the above, it will be further understood that the fold latch assembly easily resets powered operation.

The ramp assembly may comprise a handle. The handle may be attached to an edge surface of the ramp to aid in moving the ramp between the deployed position and the ground engaging position. When the ramp comprises two ramp portions, the handle is generally attached to the outer ramp portion. When the ramp comprises two ramp portions and is equipped with the fold latch, the handle may be attached to the ramp adjacent the fold latch lever. The colocation of the handle allows a one-hand operation where the user first unlatches the outer ramp portion and then grabs, with same hand, the handle. Unlatching may comprise pivoting the fold latch lever away from the target. As described above, the spring may be provided to bias the fold latch lever into the latched position.

Herein is also disclosed a manual actuator release device. In an event that the actuator fails to move the ramp under power between the deployed and ground engaging positions, the manual actuator release device is designed to remove a fixed relationship between the free end of the main rod shaft and the ramp and allow manual rotational movement of the ramp about the horizontal axis. In order to prevent the main rod shaft from interfering with rotational motion of the ramp, the ramp may be designed so that released free end of the main rod shaft slides along an edge of the ramp. The sliding motion may be achieved with a track that is mounted on a side edge of the ramp and a guide sized and shaped to linearly move within the track. The free end of the main rod shaft is coupled to the guide. The track comprises a recess that is sized larger than opening of the track. A pin is sized to be received within (engage) the recess. The pin further passes through an aperture in the guide and is coupled, under tension, to a hand knob. During powered operation, the pin is biased for engagement with the recess and fixes the position of the guide and the free end of the main rod shaft relative to the ramp. For manual operation, the knob is designed to pull the pin from the engagement with the recess, rotate about a quarter turn and rest on a stop so that the pin does not reengage the recess. Thus, the guide and the free end of the main rod shaft are allowed to move within the track and essentially decouple the actuator from the ramp.

When the ramp comprises two ramp portions as described above, the manual actuator release device will be coupled to a side edge of the inner ramp portion.

When the powered ramp assembly, as described above, includes the fold latch, the fold latch lever is coupled to the pin for a movement and a rotation therewith and the slot(s) is(are) fixed on the guide. The fold latch lever is designed to be manually lifted when the manual actuator release is used to manually move the platform from deployed position into the ground engaging position.

When the ramp comprises two ramp portions, the ramp assembly may comprise a sensor that is mounted in a position and that is operable to output a signal annunciating orientation of the two ramp portions. The signal is received by the controller. The signal may annunciate a folded position of the inner and outer ramp portions. The signal may annunciate an unfolded position of the inner and outer ramp portions.

Herein is also disclosed a latch assembly. The latch assembly may comprise a latch and a latch mounting element. The latch mounting element is configured to position the latch at a distance from a mounting structure. The mounting structure may be a surface. The mounting structure may be referred to as a support structure. The latch and the latch mounting element may comprise a metal. The latch and the latch mounting element may comprise a polymer. The latch and the latch mounting element may comprise a combination of metal and polymer.

The latch mounting element may comprise a plate-shaped member configured to be attached to the mounting structure and two latch flanges extending from the plate-shaped member. The plate-shaped member may be attached with fasteners. Fastener may be passed through aperture in the plate-shaped member. The plate-shaped member may be attached with adhesive. The plate-shaped member may be attached by welding.

The latch is attached to a distal end of each latch flange. The latch may be rigidly attached to the distal end of each flange, for example by way of any one of a welding, and an adhesive. The latch may be provided as integral with the latch flanges, for example by way of a casting or a molding. In either design, the latch may be disposed in a plane being parallel to a plane of the plate-shaped member.

The latch mounting element may comprise a flange, where one end of the flange is configured (designed) to be attached to the mounting structure and the other end of the flange is configured (designed) to be attached to the latch. The one end of the flange may be attached with fasteners. The one end of the flange may be attached with adhesive. The one end of the flange may be attached by welding.

The latch mounting element may comprise a housing. The housing may comprise a peripheral wall defining a hollow interior and an open end, and a mounting flange extending outwardly from the peripheral wall. The mounting flange may comprise two mounting flanges, each mounting flange extending outwardly from the peripheral wall. The latch may be mounted for a rotation between a retracted position where the latch is disposed within the hollow interior and a deployed position where the latch extends through the open end past an edge of the peripheral wall. The deployed position of the latch may coincide with the deployed position of the ramp. The retracted position of the latch may coincide with the stowed position of the ramp.

The latch assembly may further comprise a latch shaft rotatably attached to the peripheral wall. In this design, the latch is attached to the latch shaft for the rotation therewith. The latch shaft may be a sized to span the width of the housing. The latch shaft may be provided as two latch shaft portions, with the latch flange being attached to each latch shaft portion. The latch flange may comprise two latch flanges disposed at a second distance from each other, each latch flange having a proximal edge attached to the latch shaft. When the two latch flanges are provided, the latch will be attached to a distal end of each latch flange for the rotation with the latch shaft.

The latch may be manually moved into the retracted position. For example, the user may simply step onto the latch. For example, the user may simply push the latch by a hand. The latch may be designed with a weight to move into the retracted position by way of a gravity. The latch assembly may further comprise a spring, the spring configured and attached to bias the latch into the retracted position. The spring may be configured to encircle a portion of the latch shaft. The spring may be selected as a torsional spring. The spring may comprise two springs disposed at a first distance from each other, each spring from the two springs configured to encircle a portion of the latch shaft.

The latch assembly may comprise a housing, a latch, a spring, and a connection with an external actuating or deactuating force. The housing may comprise a peripheral wall defining a hollow interior and an open end. The latch is mounted within the hollow interior for a rotation between a retracted position where the latch is disposed within the hollow interior and a deployed position where the latch extends past an edge of the peripheral wall defining the open end. Thus, the latch assembly may be referred to as a retractable latch assembly or a retractable latch. The latch may be rigidly attached to a shaft, where the shaft is mounted for a rotation within the hollow interior. The spring may be coupled to the latch and to the peripheral wall, the spring biases the latch into the retracted position. The connection may be configured to allow a rotation of the latch from the retracted position into the deployed position. The connection may be configured to allow a rotation of the latch from the deployed position into the retracted position.

The latch assembly may comprise a latch actuator. The latch actuator may be a rotary actuator coupled to a rotating latch shaft that the latch is attached to. The rotary actuator may be a rotary solenoid. The rotary actuator, when provided, will be coupled to a power source and may be coupled to the controller. The rotary actuator may be actuated in a response to a control signal supplied from the controller and may be deactuated in a response to another control signal from the controller. When the latch assembly comprises the rotary actuator, the connection may be between the actuator and the latch shaft.

The latch assembly may comprise a cable arm attached to the latch shaft for the rotation therewith and an actuating cable attached to the latch to rotate the latch into the deployed position and allow the rotation of the latch into the retracted position. The latch assembly may further comprise a connection with a latch operating device, the connection configured to allow the latch operating device to rotate the latch from the retracted position into the deployed position.

The latch assembly may comprise the latch operating device. The latch operating device may comprise a shaft mounted for a rotational movement, a force receiving element, the force receiving element mounted on the shaft for the rotational movement therewith, a lever, the lever mounted on the shaft for the rotational movement therewith, and an operating spring, the operating spring having one end connected to the lever, the operating spring having another end thereof connectable to a cable. This latch assembly may comprise the cable, wherein the operating spring configured to pull the cable in one direction when the shaft rotates due to a force received by the force receiving element, the operating spring being further configured to allow the cable to move in an opposite direction when the force is no longer received by the force receiving element.

The latch assembly, as described above, may comprise a ramp support, the ramp support defining each of a vertical axis and a horizontal axis, the shaft attached for the rotational movement to a stationary portion of the ramp support. The latch assembly, as described above, may comprise a ramp, the ramp configured to attach to the ramp support, the ramp configured to rotate about the vertical axis and about the horizontal axis.

The latch assembly may comprise a latch release, the latch release comprising a link attached to the operating spring, an elongated slot through a thickness of the link and a latch release lever rotationally attached to a stationary portion of the ramp support and passed through the elongated slot.

The latch assembly may comprise a latching and release mechanism. The latching and release mechanism may comprise a mounting element, the mounting element comprising two edge notches, a first lever comprising a first latch engaging portion aligned with one edge notch from the two edge notches, the first lever rotatable, in a first rotational connection with the mounting element between a first latched position and a first unlatched position, a first spring, the first spring biases the first lever into the first latched position, a second lever comprising a second latch engaging portion aligned with another edge notch from the two edge notches, the second lever rotatable in a second rotational connection with the mounting element between a second latched position and a second unlatched position, a second spring, the second spring biases the second lever into the second latched position, and a handle mounted for a slidable movement about the mounting element, the handle further mounted in a rotational connection with each of the first lever and the second lever, the handle configured to move the first lever into the first unlatched position and move the second lever into the second unlatched position.

The latch assembly may comprise a latching and release mechanism that is designed with a notch, a lever comprising a latch engaging portion aligned with the notch, the lever rotatable, in a rotational connection between a first latched position and a first unlatched position, a spring, the spring configured to bias the lever into the first latched position, and a handle, the handle in a rotational connection with the lever, the handle configured to move the lever into the unlatched position.

A latch assembly may comprise a latch with a housing that has a peripheral wall with a cable access and defining a hollow interior and an open end, a latch shaft, the latch shaft mounted for a rotation within the hollow interior, a latch lever, the latch lever attached to the latch shaft for the rotation therewith between a retracted position where the latch lever is disposed within the hollow interior and a deployed position where the latch lever extends through the open end past an edge of the peripheral wall, a cable arm attached to the latch shaft opposite the latch lever, and two latch springs, each latch spring from the two latch springs configured to encircle a portion of the latch shaft at each end of the latch lever, the each latch spring configured to bias the latch lever into the retracted position. The latch assembly may further comprise a cable, the cable comprising one end thereof attached to the cable arm. The latch assembly may further comprise a latch operating mechanism with a shaft mounted for a rotational movement, a force receiving element, the force receiving element mounted on the shaft for the rotational movement therewith, an operating lever, the operating lever mounted on the shaft for the rotational movement therewith, and an operating spring, the operating spring having one end connected to the operating lever, the operating spring having another end thereof connectable to an opposite end of the cable, where the latch operating mechanism configured to tension the cable in a response to rotation of the shaft in a first direction and to rotate the latch lever into the deployed position. The latch assembly may further comprise a latching and release mechanism with a lever comprising a latch engaging portion, the lever rotatable, in a rotational connection between a first latched position and a first unlatched position, a spring, the spring biases the lever into the first latched position, and a handle, the handle in a rotational connection with the lever, the handle configured to move the lever into the unlatched position. This latch assembly may further comprise a ramp assembly with a support and a ramp mounted on the support for a rotation between a stowed position and a deployed position, the latch assembly being disposed remotely from the ramp assembly, the latch operating mechanism coupled to the support, the latching and release mechanism attached to an edge of the ramp.

A latch assembly may comprise a first lever comprising a first latch engaging portion, the first lever rotatable, in a first rotational connection between a first latched position and a first unlatched position, a first spring, the first spring biases the first lever into the first latched position, a second lever comprising a second latch engaging portion, the second lever being in a second rotational connection, the second lever rotatable between a second latched position and a second unlatched position, a second spring, the second spring biases the second lever into the second latched position, an actuator, and a connection between the actuator and each of the first and second levers, the actuator configured to rotate the first and second levers through the connection into corresponding unlatched positions.

A latch assembly may comprise a lever, the lever rotatable, through a rotational connection, between a latched position and an unlatched position, a spring, the spring mounted to bias the lever into the latched position, an actuator, and a connection between the actuator and the lever, the actuator configured to rotate the lever through the connection into the unlatched position.

The latch actuator, when provided, may be mounted on the support and connected with the latch assembly with a cable. In this design, the connection in the latch assembly is configured to receive the cable and couple to the cable to the latch. When the latch is connected to the shaft, the connection may couple the cable to the shaft. The other end of the cable is coupled to a second shaft where the second shaft is mounted, at one end thereof, for a rotation on the support. A force receiving element is mounted on the second shaft for a rotation therewith and a force transmitting element is mounted for a rotation to engage the force receiving element causing rotation of the second shaft and a subsequent movement of the cable, through the spring, away from the housing. As the cable moves away from the housing, the cable rotates the latch into the deployed position. When the force transmitting element rotates in an opposite direction, the cable moves toward the housing losing the tension and allowing the spring in the latch assembly to return the latch into the retracted position. The latch actuator may comprise an actuator spring installed between the cable and the second shaft (within the latch actuator) to prevent an over-tension condition within the cable. Otherwise, the actuator spring remains solid and does not extend. When spring is provided, the latch rotates into a latch deployed position when the actuator spring pulls the cable and the latch rotates from the latch deployed position when the spring releases said cable.

The latch assembly may be used in an application to latch a ramp in the deployed position. The latch assembly may be used in an application to latch a ramp in the stowed position. When the ramp is installed on a vehicle, the open end of the housing may be mounted flush with the floor surface. The open end may be closed with a cover, where the cover has a through opening allowing the rotation of the latch between retracted and deployed positions. The cover may be positioned generally flush with a floor surface. The latch may protrude above the edge of the peripheral wall but may be flush or below the surface of the cover. The latch may protrude above the edge of the peripheral wall but may be flush or below the floor surface.

The retractable latch, as described above, does not cause a tripping hazard when a width of the ramp is smaller than a width of the opening. In this application a non-retractable latch will be positioned between the sides of the opening and extend upwardly above the floor surface. The retractable latch is generally disposed below or flush with the floor surface. Although vehicles with wider doors may accommodate ramp of a wider width, not all vehicle have wider doors. Thus, challenges may be present, particularly in a paratransit application, when vehicles with mixed width doors are being used.

When the ramp is installed on a vehicle and when the latch actuator comprises the cable, the cable will be at least partially mounted below the vehicle floor or within the floor structure and the force transmitting element may be mounted on a rotating column within the ramp support.

The latch actuator comprising cable does not require power to rotate the latch between retracted and deployed positions.

When the ramp, being disposed vertically, is designed to be latched in the deployed position by way of a cable, as described above, and is further designed to rotate past the deployed position, a manual release device may be provided to temporarily rotate the latch from the (latch) deployed position prior to rotation of the ramp past the deployed position. The manual release device may comprise a link, where the link is disposed between and connected to the actuator spring and the cable, the link having a slot through a thickness of the link, the actuator spring connected to the cable through the link. A lever is passed through the slot and has one end thereof being rotationally connected to the stationary structure that may be a stationary portion of the support. When cable is pulled through the actuator spring, the link rotates the lever in an upward direction. Prior to the rotation of the ramp past the deployed position, a force is applied an opposite end of the lever, causing the lever to rotate downwardly, extending the actuator spring and releasing the cable. The force may be applied by the user stepping onto the opposite end of the lever with a foot. When cable is released, the latch rotates into the retracted position. Before the ramp is rotated back into the deployed position, the force is released from the lever, causing the actuator spring to pull the cable and rotate the latch into the deployed position.

The present disclosure also teaches a latching device designed to selectively latch and unlatch a vehicle ramp in the deployed position.

The latching device may comprise a latch assembly as described above, the latch actuator as described above and a latch/unlatch mechanism, as described below.

The latch/unlatch mechanism may comprise a lever, the lever rotatable, through a rotational connection, between a latched position and an unlatched position, a spring, the spring biases the lever into the latched position and into engagement with the latch, an actuator, and a connection between the actuator and the lever, where the lever rotates, through the connection, into the unlatched position in a response to an actuation of the actuator. The lever may comprise a hook-shaped portion defined by an inclined edge surface and an edge notch positioned adjacent the inclined edge surface. The notch is shaped and sized to receive latch therewithin. The inclined edge surface allows the lever to rotate in a response to a contact with the latch and then return due the bias force from the spring. An unlatch command from the controller may simply comprise a removal of the voltage signal to actuate the actuator. An unlatch command from the controller may simply comprise an application of the voltage signal to actuate the actuator. The actuator may be a linear solenoid. The actuator may be a rotary solenoid. The actuator may be a pneumatic cylinder. The actuator may be a hydraulic cylinder. The actuator may be of an automotive door latch actuator type. When the ramp assembly employs the cable, as described above, at approximately ⅔ of the way through the deploy rotating movement of the ramp from the stowed position, the cable is pulled by the cable actuator such that the retractable latch rotates and deploys (extends) from the latch housing. Accordingly, as the ramp completes the rotating movement toward the deployed position, the lever on the ramp engages the deployed latch, locking the ramp in the deployed position in front of the vehicle doorway. To rotate from the deployed position back to the stowed position, the unlatch actuator is commanded to lift the latch lever and release the latch. As the ramp rotate or rotates into the stowed position, the tension on the cable is reduced, allowing the latch to return, by rotating, into retracted position due to the bias force from the spring. Furthermore, the spring biases or returns the lever into the position to engage the latch at the next latching application.

The lever may be biased, with a spring, for engagement with the latch. The lever may comprise a slot allowing the lever to lift in a response to a contact with the latch. The deployed latching device may be further designed to cage the latch. A cut-out or a notch may be provided in the mounting plate to receive the latch where the latch is than being caged between an edge of the cutout and an edge of the lever. Thus, a permanent engagement is maintained when the ramp rotates between deployed and ground engaging position since the cut-out and the hook shaped portion of the lever will also rotate relative to the latch that is remains stationary. This caging of the latch at least minimizes if not completely eliminates an undesirable movement of the inner end of the ramp during boarding and alighting.

In an event that the actuator in the latch/unlatch mechanism fails to lift the lever under power, the ramp assembly may comprise a manual deployed latch release device. Such manual deployed latch release device may comprise a link that is rotationally coupled at one end to the actuator and is coupled to the slot within the deployed lever. A release lever is also coupled to the link adjacent the end of the actuator. During powered operation, the actuator lifts the link that results in the lifting movement of the deployed lever. During manual operation, the user moves the release lever in an upward direction, overcoming the actuator and lifting the deployed lever. The end of the release lever may be positioned adjacent a top edge of the ramp for ease of reach.

It is to be understood, that the ramp assembly may be adapted with the lever only, without the actuator for a manual-only release of the latch target. Furthermore, the release lever may be replaced with a cable.

A sensor may be provided to sense a presence or an absence of the latch and output a respective signal that is received by the controller. A sensor may be of a proximity type. A sensor may comprise a mechanical switch actuated by a direct contact with the latch.

The deployed latching device may comprise a latch actuator. The latch actuator has a portion that engages a floor receptacle upon receipt of the latch command from the controller. The latch command may be a voltage signal that is applied, through the controller, to the latch actuator and remaining while the latch actuator is in the latched position, engaging the receptacle. The floor receptacle may be an aperture in the floor structure. The floor receptacle may have a latch target that protrudes above the floor surface. An unlatch command from the controller may simply comprise a removal of the voltage signal to actuate the latch actuator. The latch actuator may be a linear solenoid. The latch actuator may be a rotary solenoid. The latch actuator may be a pneumatic cylinder. The latch actuator may be a hydraulic cylinder. The latch actuator may be a motor-operated linear actuator.

The deployed latching device may comprise a latch actuator mounted in the vehicle floor. The latch actuator has a portion that engages a ramp mounted receptacle in a response to a receipt of the latch command from the controller. The receptacle may be an aperture in the ramp. The receptacle may have a portion that extends outwardly from the ramp. The latch command may be a voltage signal that is applied, through the controller, to the latch actuator and remaining while the latch actuator is in the latched position, engaging the receptacle. An unlatch command from the controller may simply comprise a removal of the voltage signal. The latch actuator may be a linear solenoid. The latch actuator may be a rotary solenoid. The latch actuator may be a pneumatic cylinder. The latch actuator may be a hydraulic cylinder. The latch actuator may be a motor-operated linear actuator.

The deployed latching device, as discussed above, latches the unsupported end of the ramp and at least minimizes if not completely prevents the unsupported end of the ramp to move when the ramp is rotating about the horizontal axis or when the ramp is being used in the ground engaging position. When the unsupported end of the ramp, being in the ground engaging position, is allowed to move, the ramp may rotate about the vertical axis toward the stowed position.

Thus, the deployed latching device may comprise driving the motor in a direction to deploy the ramp, when movement of the ramp in a direction to stow the ramp is detected. Movement detection may be achieved with an encoder coupled to the motor and outputting both the rotation rate and direction of the rotation to the controller.

The present disclosure also teaches a stowed latching device designed to latch the ramp in the stowed position.

The stowed latching device may comprise driving the motor, with a controller, in a direction to stow the ramp, should controller detect a movement of the ramp toward the deployed position. Movement detection may be achieved with an encoder coupled to the motor and outputting both the rotation rate and direction of the rotation to the controller.

The stowed latching device may comprise a latch/unlatch actuator mounted on the ramp and a latch. The latch/unlatch actuator may have a portion that engages a floor-mounted latch in a response to a receipt of the latch command from the controller. The latch may be an aperture in the floor structure. The latch may be a receptacle within the floor structure. The latch may be mounted on a floor surface of the vehicle and may have a portion that protrudes above the floor surface. The latch command may be a voltage signal that is applied, through the controller, to the latch actuator and remaining while the latch actuator is in the latched position, engaging the receptacle. An unlatch command from the controller may simply comprise a removal of the voltage signal. The latch/unlatch actuator may be a linear solenoid. The latch/unlatch actuator may be a rotary solenoid. The latch/unlatch actuator may be a pneumatic cylinder. The latch/unlatch actuator may be a hydraulic cylinder. The latch/unlatch actuator may be a motor-operated linear actuator.

The stowed latching device may comprise a latch/unlatch actuator mounted in the vehicle floor. The latch/unlatch actuator having a portion that engages a ramp mounted receptacle in a response to a receipt of the latch command from the controller. The receptacle may be an aperture in the ramp. The receptacle may have a portion that extends outwardly from the ramp. The latch command may be a voltage signal that is applied, through the controller, to the latch actuator and remaining while the latch actuator is in the latched position, engaging the receptacle. An unlatch command from the controller may simply comprise a removal of the voltage signal. The latch/unlatch actuator may be a linear solenoid. The latch actuator may be a rotary solenoid. The latch/unlatch actuator may be a pneumatic cylinder. The latch/unlatch actuator may be a hydraulic cylinder. The latch actuator may be a motor-operated linear actuator.

The ramp assembly may be designed to latch the ramp in both the deployed and stowed positions. Such ramp assembly may be adapted with two levers. One latch lever is being mounted to engage a deploy latch and the other latch lever is being mounted to engage a stow latch. Each latch lever has an edge notch adjacent one end edge and an inclined edge surface in the one end edge, thus defining a hook-shaped portion of the latch lever. The link is then configured to couple both latch levers to the unlatch actuator and/or the manual release lever.

The latching device may comprise a latch assembly as described above and a latch/unlatch mechanism, as described above.

The present disclosure also teaches a ramp system. The ramp system comprises a ramp assembly as described above, a deployed latching device, as described above and a stowed latching device as described above. The ramp assembly comprises a ramp that may be manually operable. The ramp assembly comprises a ramp that may be operated with a powered actuator.

The present disclosure also teaches a ramp system. The ramp system comprises a ramp assembly as described above and a deployed latching device as described above. The ramp assembly comprises a ramp that may be manually operable. The ramp assembly comprises a ramp that may be operated with a powered actuator.

The present disclosure also teaches a ramp system. The ramp system comprises a ramp assembly as described above and a stowed latching device as described above. The ramp assembly comprises a ramp that may be manually operable. The ramp assembly comprises a ramp that may be operated with a powered actuator.

The present disclosure also teaches a vehicle comprising the ramp system as described above. The vehicle may be a low floor vehicle. The vehicle may be a minivan. The vehicle may be a passenger van. The vehicle may be a bus. The vehicle may be of a type as used in a ride share environment. The vehicle may be a cargo van. The vehicle may be a semi-trailer. Since many cargo vans or semi-trailers may not be equipped with a ramp, the ramp assembly, as described above, provides for an economical approach to allow loading or unloading cargo from a street level. The ramp assembly, as described above, may also reduce costs relative to equipping the cargo van or a semi-trailer with a power-operated lift.

The present disclosure also teaches a method of configuring two different surfaces spaced apart from each other in a vertical direction between use by one of an ambulatory individual, a semi-ambulatory individual, a limited mobility individual a non-ambulatory individual and any combinations thereof. The non-ambulatory individual may use a personal mobility vehicle (not shown). The limited mobility individual may use a conventional walker for support and/or may have difficulty of stepping up or down.

The method may be used in an application where one surface is a ground surface and the other surface is a vehicle floor surface. The ground surface may be a street level surface.

In this application, the method provides a ramp assembly that is generally mounted within the vehicle interior in a stowed position. Accordingly, the following method description will be presented in view of such mounting.

The operating cycle generally starts with the ramp in the stowed position. Upon selection of the "Deploy" command on the operator interface, which may be a pendant, a rotate actuator mechanism is commanded, through a controller, to rotate the ramp from the stowed position into the deployed position across the door opening of the vehicle about a vertical axis. When the ramp assembly comprises a floor mounted stowed latch and a ramp mounted unlatch actuator, the unlatch actuator is commanded, through a controller, to lift the stowed latch lever and release a stowed target within the stowed latch before effecting the rotation of the ramp. The ramp rotation may be achieved by rotating a first gear mounted at an output end of the actuator within the actuator mechanism, causing a rotation of a second gear coupled to the ramp, where teeth of the first gear mesh with teeth of the second gear. Rotation of the first gear may be achieved through a planetary gearbox. A ratio of the planetary reduction within the gearbox may be such that the gearbox may be easily back-drive to effect a manual operation of the ramp.

At approximately ⅔ of the way through the deploy rotation, a retractable latch actuator cable is pulled by the cable actuator mechanism such that the retractable deployed latch rotates or extends from the retractable, in-floor deployed latch housing. Accordingly, as the ramp completes the rotation toward the deployed position in front of the vehicle door, the deployed lever engages onto the deployed latch, locking the ramp in the deployed position in front of the vehicle doorway. Simultaneously, a deployed limit switch becomes proximate to the metallic, horizontal shaft on the deployed latch, changing the state of the limit switch.

Once latched in front of the vehicle doorway and the deployed limit switch is activated, the ramp unfold function becomes enabled.

Upon pressing the ramp "unfold" command, the ramp fold/unfold actuator within the fold/unfold actuator mechanism begins to push against the fold/unfold actuator retaining pin. As the pin begins to move, it traverses a slot in the fold actuator guide. The pin is also engaged with the ramp fold hook. Accordingly, as the pin moves in the slot, the fold lever is raised thereby releasing the outer ramp portion. As the fold/unfold actuator forces the pin to the end of the slot, the ramp begins to unfold. The fold/unfold actuator continues to extend until the ramp reaches the ground.

After passengers are boarded and/or alighted from the vehicle, the operator may depress the ramp "fold" command, the action of which energizes the ramp fold/unfold actuator causing it to retract, the action of which causes the ramp to begin folding back toward the upright position. If the fold/unfold actuator malfunctions, the operator may use the release mechanism to uncouple the fold/unfold actuator from the ramp and manually fold the ramp portions.

To reduce the force required of the fold/unfold actuator, a pneumatic counterbalance is provided. Accordingly, as the ramp reaches the near folded position, pneumatic counterbalance effectively "runs away" from the ramp fold/unfold actuator, allowing the fold hook to engage the target, effectively locking the ramp in the folded position. Simultaneously, as the ramp reaches its fully folded position, the ramp fold switch flag becomes proximate with the ramp fold limit switch, the action of which changes the state of the limit switch thereby enabling the ramp "stow" function.

With the ramp "stow" function enabled, the operator may depress the ramp "stow" command. Once the ramp "stow" command is actuated, the deployed latch release actuator is energized causing the deployed lever to raise from the retractable deployed latch. The actuator pulls through a link that is affixed to a plastic bearing block slidably connected to a slot in the mounting element. The sliding of the plastic block simultaneously unlatches both the deployed and stowed latch levers. Each lever is rotationally or rotationally connected to the same mounting element and each equipped with a return spring.

As the latch lever is released from the deployed latch, the rotate actuator is energized causing the ramp to rotate inward, away from the vehicle door. Immediately after the ramp begins rotating inward, the retractable deployed latch returns to the underfloor position as the tension on cable reduces.

As the ramp reaches the fully stowed position, the stowed lever is pushed up by the fixed stowed latch. As the inclined (ramped) surface on the front of the hook clears the fixed stowed latch, the return spring biases the stowed lever, locking the ramp into the stowed position. Simultaneously, the ramp stowed limit switch becomes proximate with the fixed stowed latch, changing the state of the limit switch and ending the ramp "stow" command.

The present disclosure teaches a method of deploying a stowed bifold ramp, the method comprises unlatching the bifold ramp, with a first lever in a latch/unlatch actuator in a response to a deploy signal from a controller, from a fixed target in a stowed latch, rotating or rotating the bifold ramp, with a rotate mechanism, between the folded stowed position and a folded deployed position, rotating a movable target in a deployed latch, with a cable coupled to the movable target and to the first mechanism, into an deployed position, latching the bifold ramp at the movable latch target with a second lever in the latch actuator, and unfolding, with an actuator mechanism in a response to an unfold signal from the controller, the bifold ramp from the folded deployed position into an unfolded ground engaging position.

The present disclosure teaches a method of stowing a deployed bifold ramp. The method comprises folding, with an actuator mechanism in a response to a fold signal from the controller, the bifold ramp from an unfolded ground engaging position into a folded deployed position, unlatching the bifold ramp, with a first lever in a latch/unlatch actuator in a response to a stowed signal from a controller, from a movable latch target in a deployed latch assembly, rotating the bifold ramp, with an actuator mechanism, between the folded deployed position and a folded stowed position, rotating the movable latch target in the deployed latch, with a cable coupled to the movable latch target and to the actuator mechanism, into a retracted position, and latching the bifold ramp in the folded stowed position with a second lever in the latch/unlatch actuator engaging a fixed latch target in a stowed latch assembly.

The present disclosure also teaches a method of boarding mobility challenged individuals into a vehicle or alighting the mobility challenged individuals therefrom, the method comprising. The method may comprise rotating, with a first actuator mechanism, a ramp from a stowed position into a deployed position; rotating, with a second actuator mechanism, the ramp from the deployed position into a ground engaging position; and using, by the mobility challenged individuals, an inclined surface of the ramp being in the ground engaging position to ingress or egress an interior of the vehicle. The method may further comprise rotating, with the second actuator mechanism, the ramp from the ground engaging position into the deployed position and rotating, with the first actuator mechanism, the ramp from deployed position into the stowed position. The method may further comprise selectively latching and unlatching the ramp in the deployed position. Selectively latching and unlatching the ramp in the deployed position may comprise rotating a latch between a retracted and deployed positions. The method may further comprise temporarily retracting the latch into the retracted position and rotating the ramp from the deployed position into a position external to the vehicle.

Selectively latching and unlatching the ramp in the deployed position may comprise engaging a latch with a lever pivotally mounted on the ramp and disengaging the latch with an actuator connected to the lever. The method may further comprise selectively latching and unlatching the ramp in the stowed position. The method may further comprise selectively latching and unlatching the ramp in each of the stowed and deployed positions. Rotating the ramp from the deployed position into a ground engaging position may comprise unfolding, with a counter balance device, an outer ramp portion from an inner ramp portion.

The present disclosure also teaches a method of boarding mobility challenged individuals into a vehicle or alighting the mobility challenged individuals therefrom. The method may comprise rotating, with a first actuator mechanism, a ramp from a stowed position into a deployed position; rotating, with a second actuator mechanism, the ramp from the deployed position into a ground engaging position; unfolding an inner ramp portion and an outer ramp portion during rotating the ramp from the deployed position into a ground engaging position; and using, by the mobility challenged individuals, an inclined surface of the ramp being in the ground engaging position to ingress or egress an interior of the vehicle, the inclined surface provided by the unfolded inner and outer ramp portions. The method may further comprise selectively latching and unlatching the inner and outer ramp portions therebetween when the ramp in one of the deployed position, the stowed position and during a movement of the ramp between the stowed and deployed positions. Rotating the ramp from the deployed position into the ground engaging position comprises manually overriding the second actuator.

Now, the subject matter will be described in a further reference to Figures.

FIGS. 1-3 illustrate a ramp assembly 10. The ramp assembly 10 is illustrated as comprising a support 20, a ramp 70 and an optional actuator mechanism 200. The support 20 defines each of a vertical axis 32 and a horizontal axis 34 during operation of the ramp assembly. The support 20 is mounted to a vehicle structure inside a vehicle interior. The support 20 may be mounted directly to a floor 6 of the vehicle. The support 20 may be mounted directly to a wall of the vehicle. The support 20 may be indirectly mounted to either the floor 6 or the wall with intervening mounting brackets (not shown). The ramp 70 is configured to support a passenger thereon. The ramp 70 is coupled to the support 20 during operation of the ramp assembly 10. The support 20 supports the weight of the ramp 70. During operation, the ramp 70 is rotated, by the actuator mechanism 200, on the support 20 about the vertical axis between a stowed position and a deployed position, as two terminal positions. The ramp 70 defines an inner end 76, an outer end 78 and two sides, 84 and 86. The outer end 78 is configured to engage a ground surface. A threshold 170 may be rotationally or pivotally coupled to the inner end 76 to bridge a gap between the inner end 76 and a vehicle floor 6 during operation of the ramp assembly 10. In other words, the threshold 170 may be referred to as a bridgeplate. A wheel 174 may be coupled to the side 86 should the ramp 70 to contact the vehicle floor 6 during rotation about the vertical axis 32. The controller 180 is illustrated as being optionally coupled to a control circuit 182 of the vehicle. The wheel 174 defines an unsupported end of the ramp 70.

Figures 4, 5, 6:
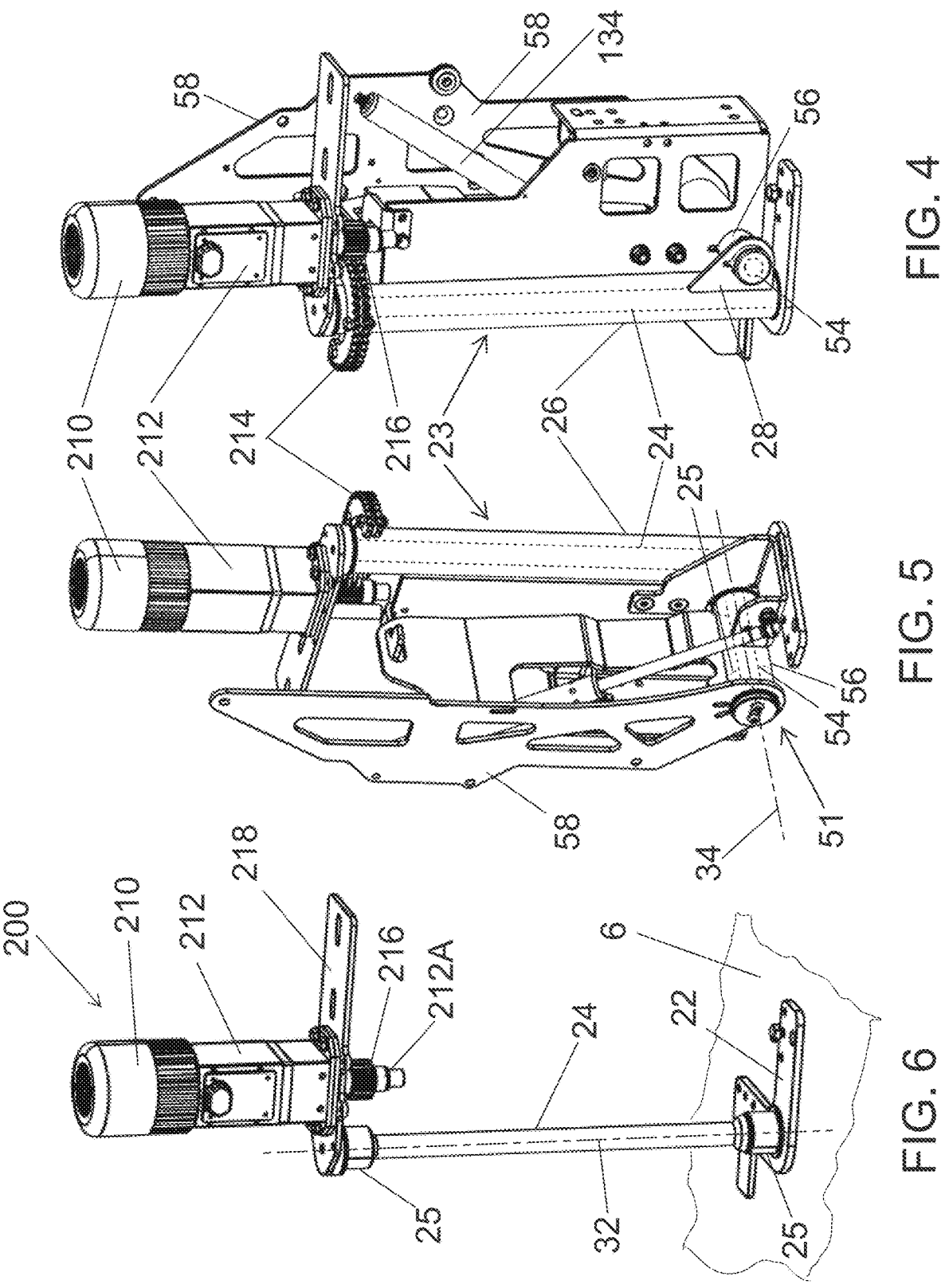
FIG. 4 illustrates a perspective view of the actuator mechanism employed within the ramp assembly.
FIG. 5 illustrates a perspective view of an actuator mechanism employed within the ramp assembly.
FIG. 6 illustrates a perspective view of an actuator mechanism employed within the ramp assembly.

FIGS. 4-5 illustrate the support 20 that comprises a base 22, a first rotate component 23, a second rotate component 51 and may further comprise an arm 58. The base 22 is configured to be mounted to a supporting structure. The first rotate component 23 upstands on the base 22. The first rotate component 23 provides the vertical axis 32. The second rotate component 51 is being coupled to the first rotate component 23. The second rotate component 51 provide the horizontal axis 34. The arm 58 is coupled to each of the second rotate component 51 and the ramp 70. It may be also considered herein that the arm 58 may be provided as an integrated component of the ramp 70. Then, the ramp 70 is to be considered as being attached to the second rotate component 51.

FIG. 6 illustrates details of an exemplary first rotate component 23 which comprises a shaft 24 and a member 26 with a hollow interior that is sized and shaped to receive the shaft 24 therewithin. The member 26 may be a hollow tube. The shaft 24 is rigidly connected to and upstands on the base 22. The shaft 24 is configured as a stationary component of the ramp assembly 10. The shaft 24 with or without the base 22 may be referred to as a mount. The shaft 24 defines the vertical axis 32. The member 26 rotates about the shaft 24. The first rotate component 23 may comprise two bearings 25, each bearing 25 positioned at a respective end of the shaft 24 between a surface of the hollow interior and a peripheral surface of the shaft 24. However, two bearing 25 may be combined into a single bearing that spans a length of the shaft 24. The first rotate component 23 allows the ramp 70 to be rotate or rotated between the two terminal positions. A flange 28 may be provided. When flange 28 is provided, such flange 28 is rigidly secured to the member 26 for a rotate or rotating therewith about the horizontal axis 34.

The second rotate component 51 comprises a shaft 54 and a member 56 with a hollow interior that is sized and shaped to receive the shaft 54 therewithin. The shaft 54 is secured to the member 26 and a flange 27 for a rotation therewith about the vertical axis 32. The shaft 54 may be referred to as a mount. The member 56 may be a hollow tube. The shaft 54 rotates within the member 56. One or more bearings, similar to the bearing(s) may be disposed between the exterior surface of the shaft 54 and interior surface of the member 56 to facilitate rotation by reducing friction forces.

In a further reference to FIGS. 1 and 4-6, the actuator mechanism 200 comprises a first gear 214, a motor (actuator) 210 and the second gear 216. The first gear 214 is secured on the support 20. The second gear 216 is secured to the member 26. The motor 210 rigidly mounted onto the shaft 24. The motor 210 may be mounted with an intermediate mounting element 218. The motor 210 is coupled to a power source 184 and to the controller 180. The intermediate mounting element 218 may be a plate-shaped member. The motor 210 comprises a stationary portion and a movable portion extending from the stationary portion. The second gear 216 may be directed secured to a free end of the movable portion of the motor 210. The second gear 216 engages the first gear 214 during the operation of the ramp assembly 10.

FIGS. 4-6 also illustrate that the actuator mechanism 200 may further comprise a planetary gearbox 212 disposed between the motor 210 and the second gear 216. The planetary gearbox 212 being coupled to an output shaft of the motor 210. The second gear 216 being coupled to an output shaft 212A of the planetary gearbox 212.

In the ramp assembly 10 of FIGS. 1-6, the ramp 70 is rotated under power from the actuator mechanism 200 about the vertical axis 32 between the stowed and deployed positions and is rotated manually about the horizontal axis 34 between the deployed and ground engaging positions.

Figures 7, 8:
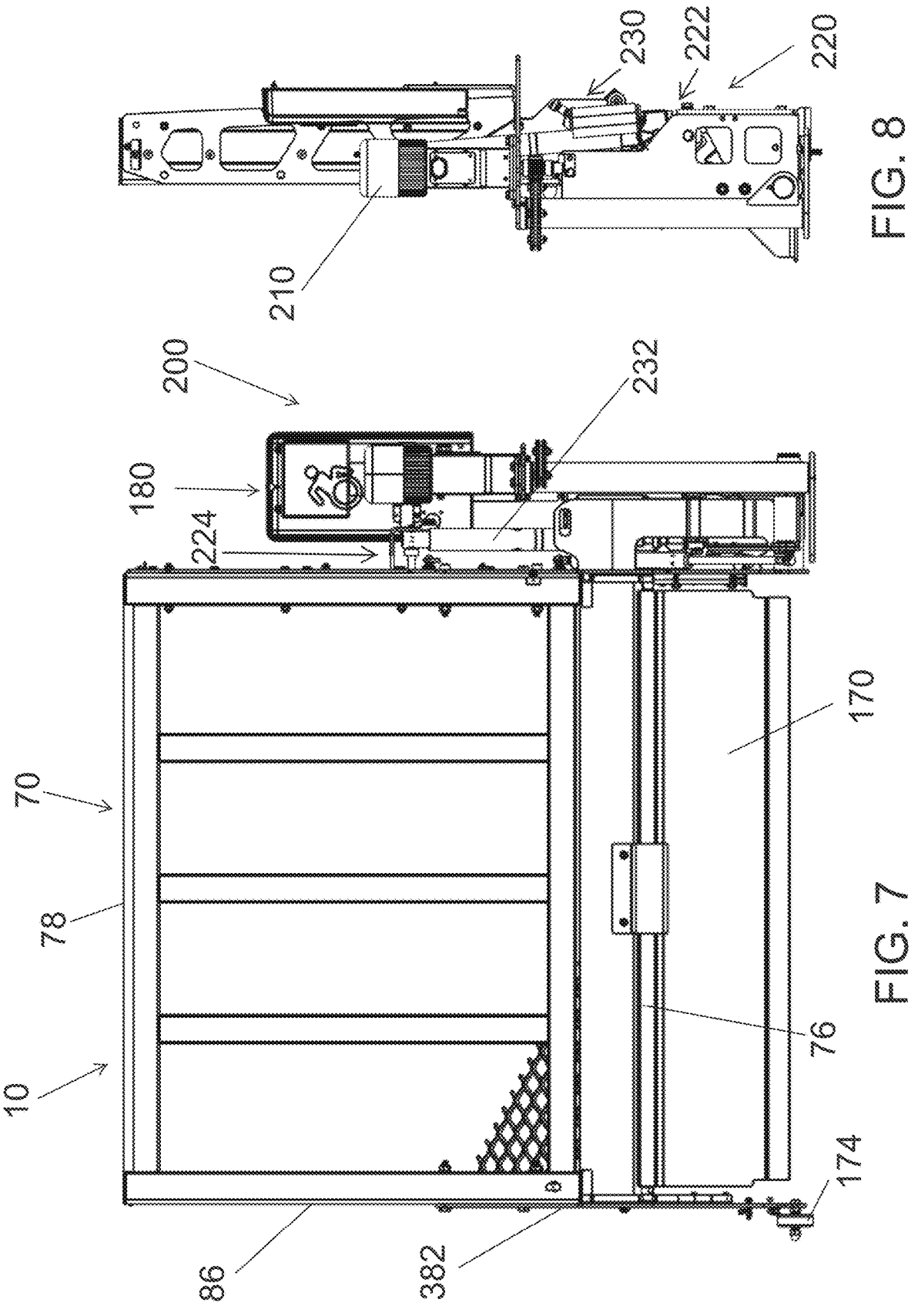
FIG. 7 illustrates an elevation view of a ramp assembly.
FIG. 8 illustrates an elevation view of the ramp assembly.
Figures 9, 10, 11, 12:
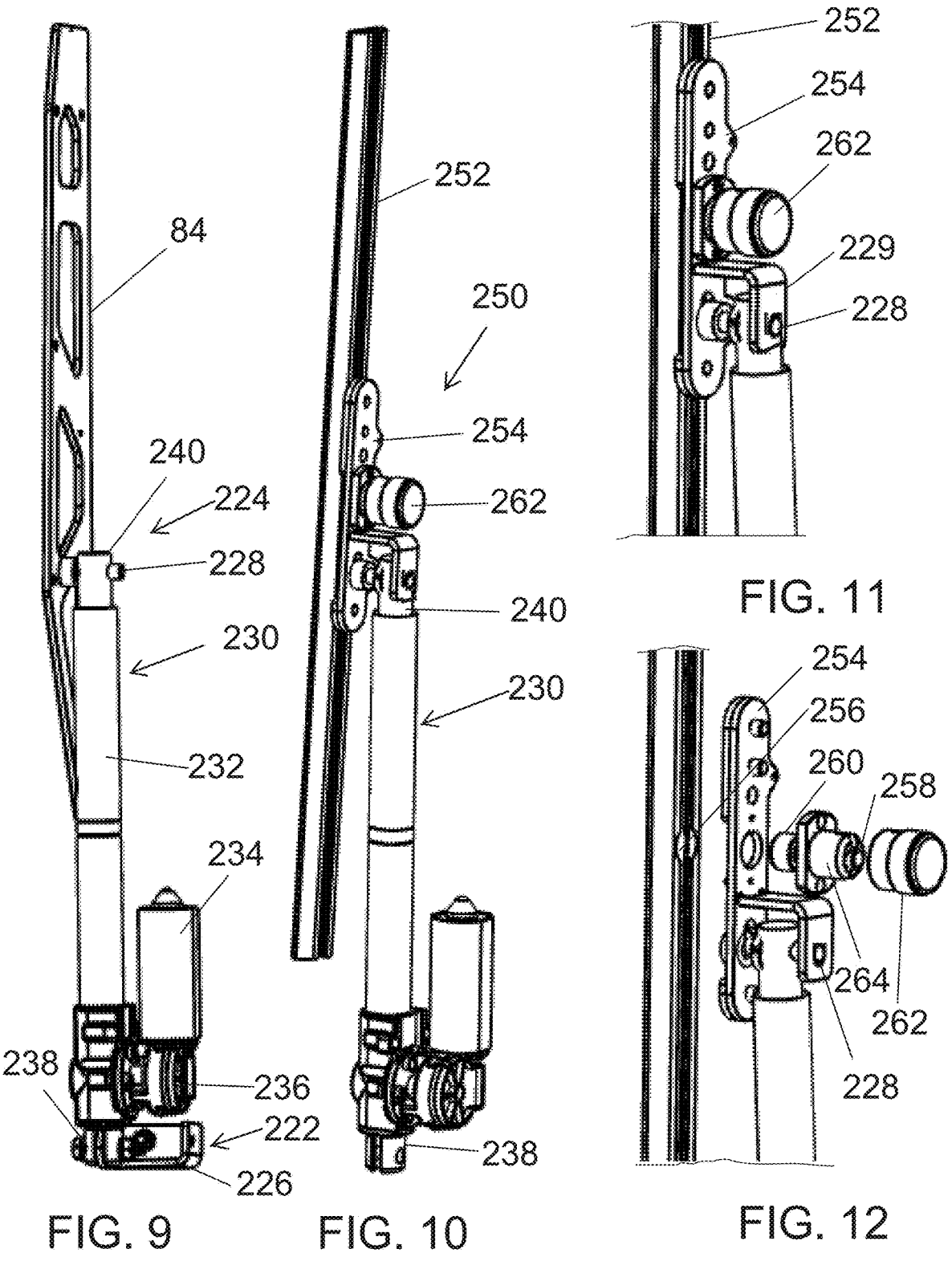
FIG. 9 illustrates a perspective view of an actuator mechanism employed within the ramp assembly, partially illustrated.
FIG. 10 illustrates a perspective view of an actuator mechanism with a release mechanism employed within the ramp assembly.
FIG. 11 illustrates an enlarged partial perspective view of the release mechanism of FIG. 10.
FIG. 12 illustrates a partial exploded view of the release mechanism of FIG. 11.

FIGS. 7-9 illustrate the actuator mechanism 200, as described above, and also illustrates an actuator mechanism 220 that is configured to rotate the ramp 70 under power between the deployed and ground engaging positions. The actuator mechanism 220 comprises an actuator 230, a rotational connection 222, and a rotatable or rotational connection 224. The actuator 230 comprises a housing 232, an electric motor 234, a gearbox 236, a housing end 238 and a movable portion 240. The movable portion 240 moves in a linear direction between deployed and retracted positions. The rotatable or rotational connection 222 is between the housing end 238 and a mount 226 that is a component of the support 20. The rotatable or rotational connection 224 is between a free end of the movable portion 240 and the side 84 of the ramp 70. The rotatable or rotational connection 224 comprises a pin 228. The movable portion 240 extends, in a response to a control signal from the controller 180, to rotate the ramp 70 from the deployed position into the ground engaging position. The movable portion 240 retracts, in a response to another control signal from the controller 180, to rotate the ramp 70 from the ground engaging position into the deployed position.

FIGS. 10-12 illustrate a release mechanism 250 that may be employed within the ramp assembly to selectively couple and decouple the movable portion 240 from the ramp 70 and enable a manual rotation of the ramp 70 between the deployed position and the ground engaging position. The release mechanism 250 comprises a track 252 on one a side of the ramp 70, a sliding portion 254 that reciprocally slides within the track 252, a recess 256 in the track 252, a pin 258 that is engaged within the recess 256, the pin 258 extends outwardly from the side of the ramp 70, the pin 258 may be provided with an enlarged end 260, and a knob 262 connected to a free end of the pin 258. The knob 262 is manually operable to selectively move the pin 258 away from the recess 256 and allowing the free end of the movable portion 240 to slide along the one side of the ramp 70 and return the pin 258 into an engagement with the recess 256 and prevent the movable portion 240 to slide along the one side of the ramp 70. A retainer 264 may be provided to retain the knob 262 in the pulled position. The knob 262 may be design to rotate and abut on the retainer 264.

Figures 13, 14:
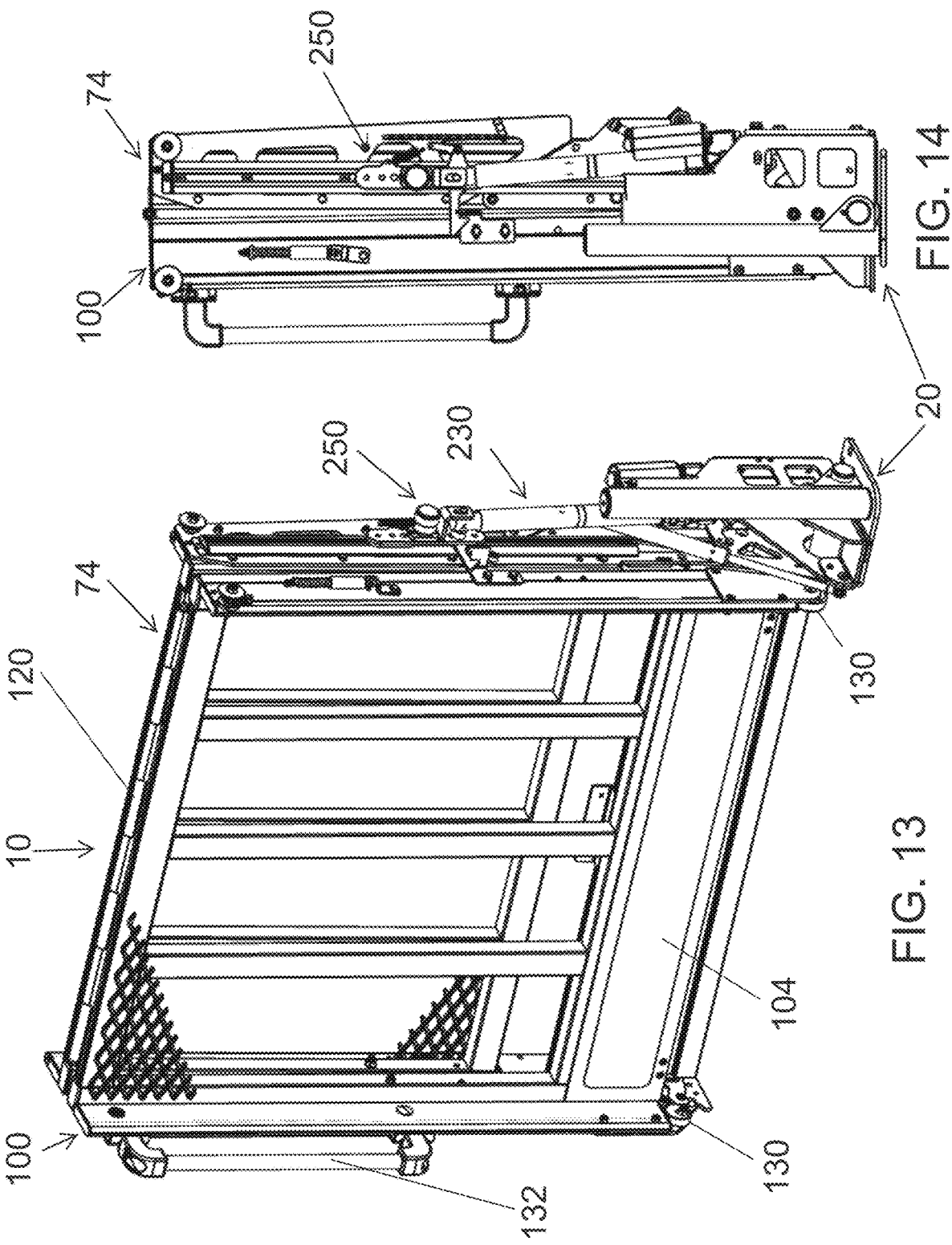
FIG. 13 illustrates a perspective view of a ramp assembly.
FIG. 14 illustrates an elevation view of the ramp assembly of FIG. 12.

FIGS. 13-14 illustrate a ramp 70 of a bi-fold construction. Such ramp 70 has an inner ramp portion 74 and an outer ramp portion 100 joined to the inner ramp portion 74 with a hinge 120. The hinge 120 may be a continuous hinge or may be provided in separate sections. A short section of the hinge 120 may be mounted adjacent each side. The outer ramp portion 100 and the inner ramp portion 74 are movable between a folded position where the outer ramp portion 100 is being disposed in a surface-to-surface facing arrangement with the inner ramp portion 74 and an unfolded position where the outer ramp portion 100 being disposed in an end-to-end facing arrangement with the inner ramp portion 74.

FIGS. 13-14 further illustrate the ramp assembly that comprises the actuator mechanism 220, as described above, and the release mechanism 250, as described above, but not the actuator mechanism 200. In other words, the ramp assembly 10 of FIGS. 13-14 is designed to be manually rotated between stowed and deployed positions and rotated under power with the actuator mechanism 220 between the deployed and ground engaging positions. A handle 132 may be attached to one side of the second ramp portion 100 for ease of rotating or rotating the second ramp portion 100 relative to the first ramp portion 74 as well for ease of rotating the ramp 70 about the axes 32 and 34.

Figures 15, 16:
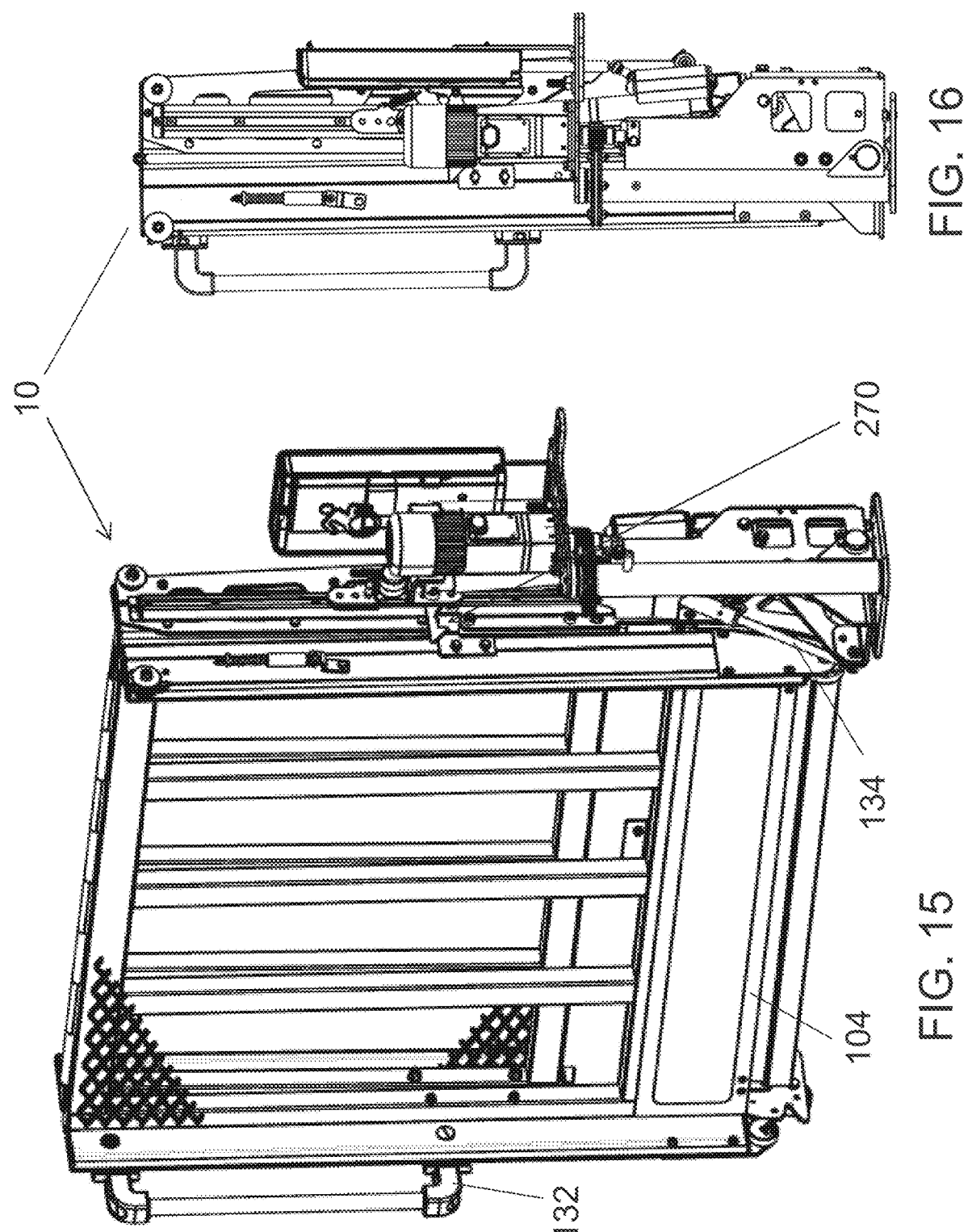
FIG. 15 illustrates a perspective view of a ramp assembly.
FIG. 16 illustrates an elevation view of the ramp assembly of FIG. 15.

FIGS. 15-16 illustrate the ramp assembly that comprises the bifold ramp 70, as described above, the actuator mechanism 200, as described above, the actuator mechanism 220, as described above, and the release mechanism 250, as described above. In other words, the ramp assembly 10 of FIGS. 15-16 is designed to be rotated under power with the actuator mechanism 200 between stowed and deployed positions and rotated under power with the actuator 230 between the deployed and ground engaging positions.

FIGS. 15-16 also illustrate the fold latch assembly 270 that is designed to latch the outer ramp portion 100 to the inner ramp portion 74 when the platform 70 is in the vertical position, either deployed, stowed or moving between deployed and stowed positions. The latch assembly 270 is designed to selectively latch the inner and outer ramp portions, 74 and 100 respectively, in the folded position and releasing the outer ramp portion 100 from the inner ramp portion 74 prior to a rotational or a rotational movement of the inner and outer ramp portions, 74 and 100 respectively, into the unfolded position.

Figures 17, 18, 19:
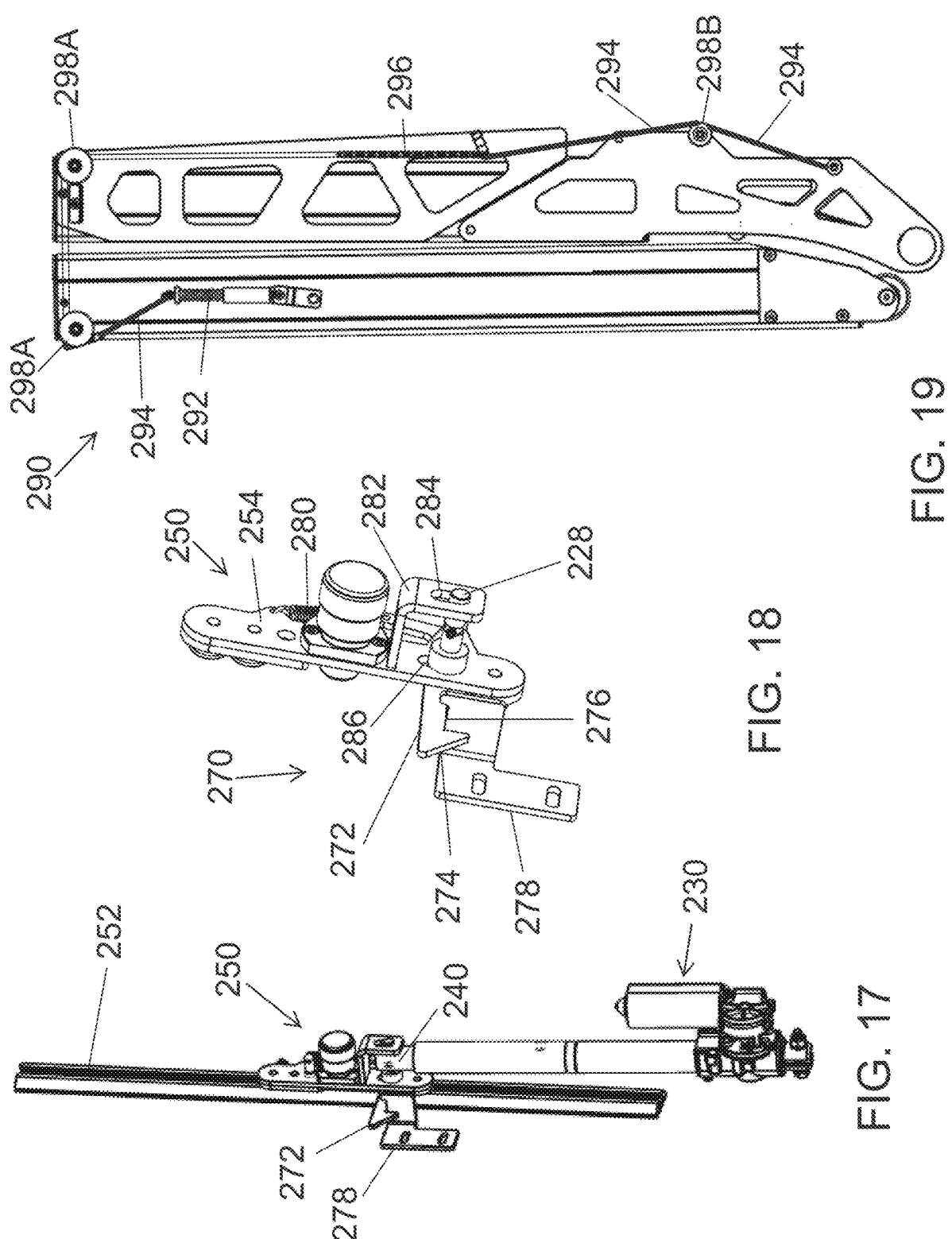
FIG. 17 illustrates a perspective view of an actuator mechanism with a release mechanism and a fold latch employed within the ramp assembly.
FIG. 18 illustrates a partial perspective view of the fold latch.
FIG. 19 illustrates a partial elevation view of the ramp assembly, particularly illustrating a tensioning device.

FIGS. 17-18 illustrate that the fold latch assembly 270 comprises a latch lever 272 with an inclined edge surface 274 and a notch 276 adjacent the inclined edge surface 274. The notch 276 is sized and shaped to engage a latch 278. The latch lever 272 is mounted to the pin 228. The pin 228 is designed to move linearly within the elongated slots 284 and 286. The elongated slot 284 is provided in the bracket 282 that is attached to the sliding portion 254 and the elongated slot 286 is provided through a thickness of the sliding portion 254. The latch lever 272 is biased by the spring 280 to engage the latch 278. When the ramp assembly 10 is provided without the release mechanism 250, the bracket 282 will be attached to the side 84 of the inner ramp portion 74. The latch 278 is attached to the outer ramp portion 100. The elongated slots 284 and 286 allow an initial extension of the movable portion 240 to lift or disengage the latch lever 272 from the latch 278 prior to the outer ramp portion 100 moving away from the inner ramp portion 74 due to continuing extension of the movable portion 240. The damper 134 is mounted and sized to force the ramp 70 into an overcenter position in a relationship to a vertical plane so as to at least reduce if not eliminate loads acting onto the latch lever 272. In other words, a clearance between the latch lever 272 and the latch 278.

FIG. 19 illustrate a tensioning device 290. As has been described above, the tensioning device 290 is designed to prevent the outer edge 104 of the outer ramp portion 100 from hitting the ground surface before the inner ramp portion 74 and the outer ramp portion 100 are in the unfolded position. The tensioning device 290 comprises a spring 292 and a combination of a cable 294 and a chain 296 chain that are routed through sprockets 298A and a pulley 298B.

Figures 20, 21:
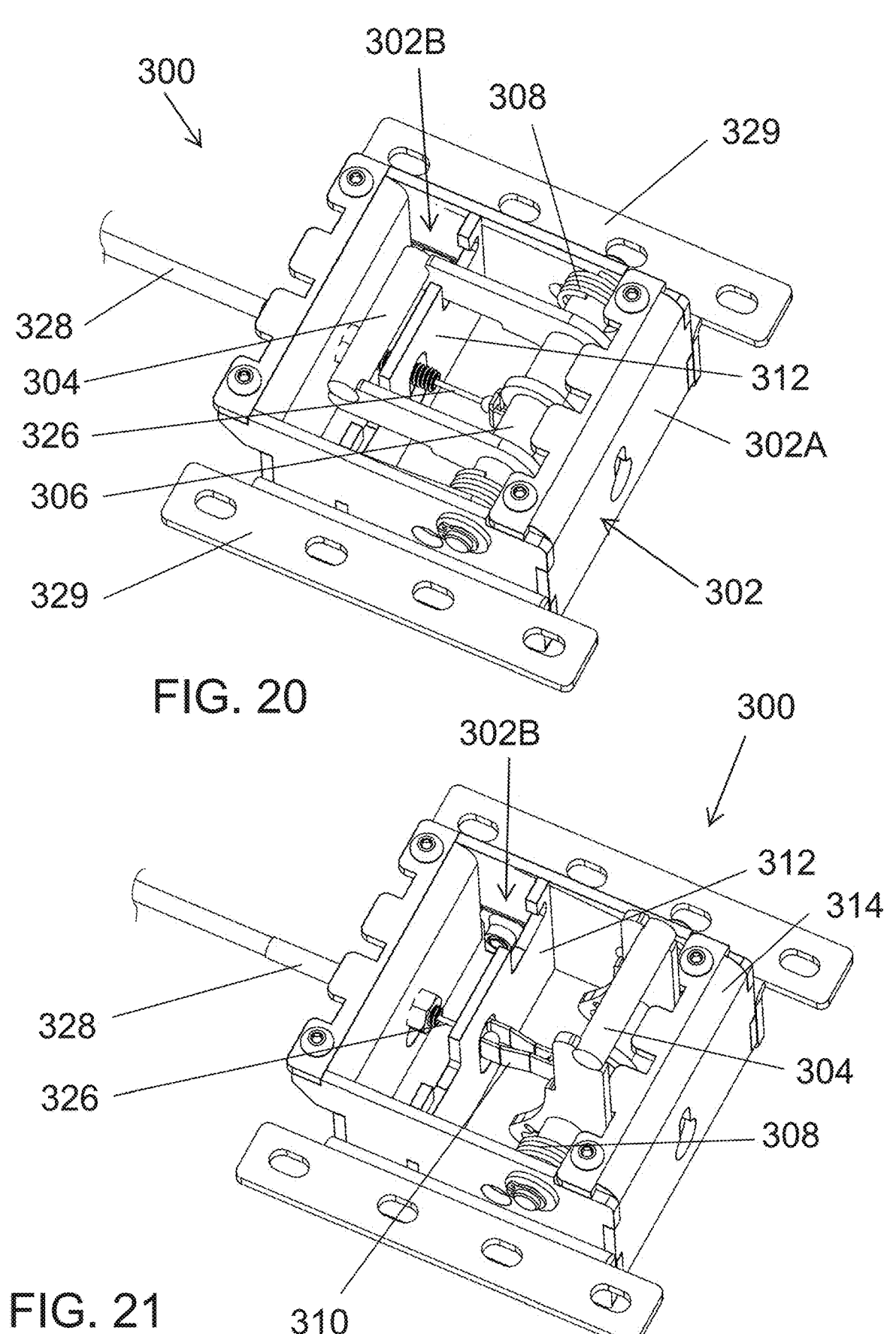
FIG. 20 illustrates a perspective view of a retractable latch assembly that can be used with the ramp assembly.
FIG. 21 illustrates a perspective view of a retractable latch assembly that can be used with the ramp assembly.
Figure 22:
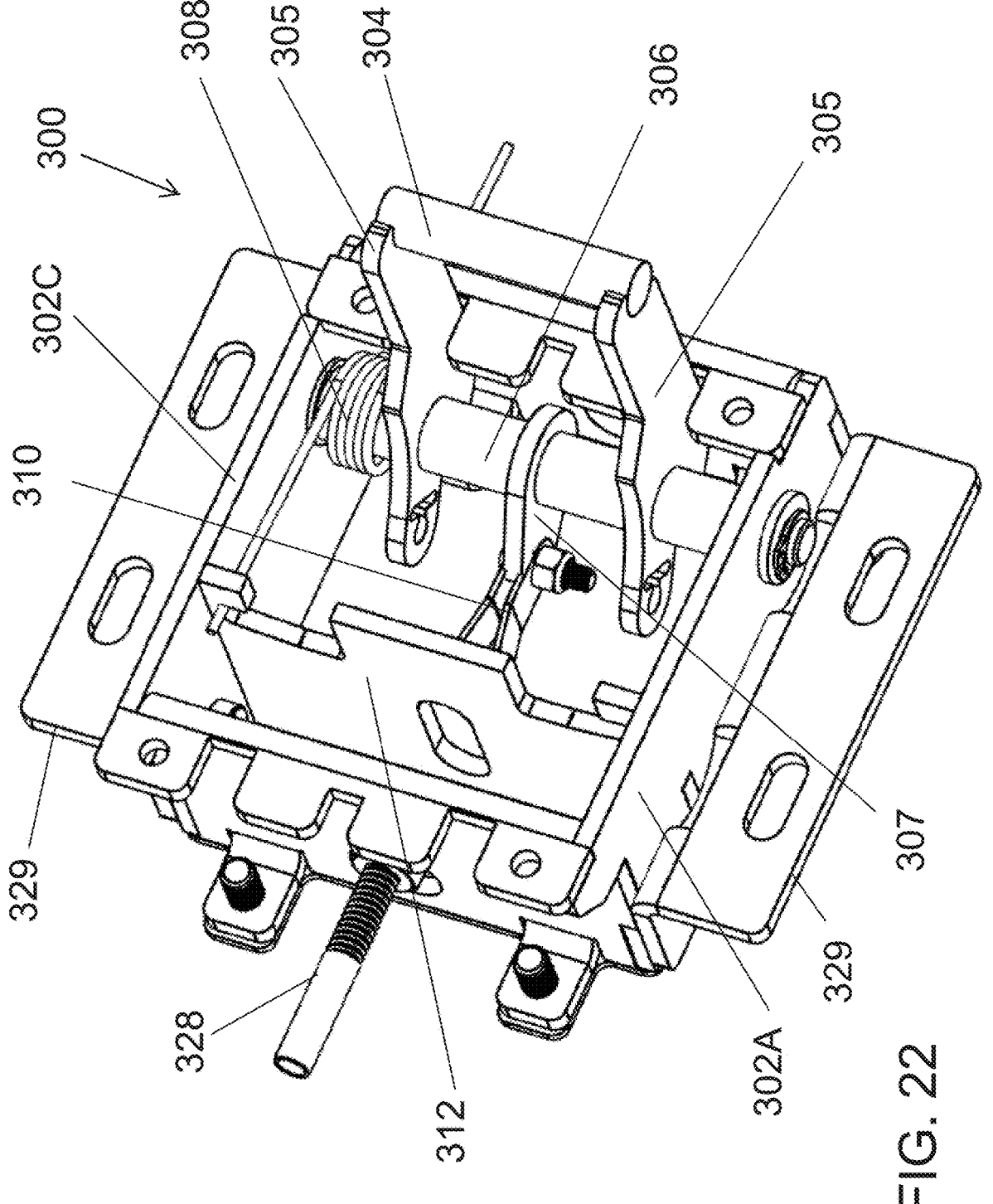
FIG. 22 illustrates a perspective view of a retractable latch assembly that can be used with the ramp assembly.

FIGS. 20-22 illustrate a retractable latch assembly 300. The retractable latch assembly 300 comprises a housing 302, a latch 304, a latch spring 308 and a connection 310 with an actuator. The latch 304 may be also referred to as a latch lever. The housing 302 comprises a peripheral wall 302A defining a hollow interior 302B and an open end with the edge 302C. On a vehicle, the retractable latch assembly 300 is designed to mount within an opening in the floor surface 6. The latch 304 is mounted, with one or two latch flanges 305, on a latch shaft 306. The latch shaft 306 is mounted for a rotation within the hollow interior 302B. Thus, the latch 304 is mounted with the latch shaft 306 for a rotation between a retracted position where the latch 304 is disposed within the hollow interior and a deployed position where the latch 304 extends past an edge 314 of the peripheral wall. In this deployed position, the latch 304 will also protrude above the floor surface 6. In other words, in the deployed position, the latch 304 may be disposed in a generally vertical plane. It is not necessary that the latch 304 is disposed in the same vertical plane with the latch shaft 306. A rotation angle between the retracted and deployed positions may be about ninety (90) degrees. The spring 308 is coupled to the latch 304 and may be coupled to the peripheral wall. The latch spring 308 may be a coil spring shaped to receive the shaft 306 therethrough. The latch spring 308 may be a torsional spring. The spring 308 is configured to bias the latch 304 into the retracted position. The spring 308 may be provided as a pair of springs 308 with each spring positioned adjacent one end of the latch 304. The latch 304 may contact a stop 312 when in the retracted position in order to terminate any further rotation due to the bias from the spring 308. The stop 312 may be a plate-shaped member disposed within the hollow interior and being attached to the peripheral wall. The connection 310 is configured to allow the actuator to rotate the latch 304 from the retracted position into the deployed position. The connection 310 may comprise a connection with a cable 326 and may include a cable arm 307 that is attached to the latch shaft 306 for the rotation therewith. The cable 326 may be provided within a cable sleeve 328. The cable sleeve 328 protects the cable 326 from chafing/abrasion during use. The connection may comprise cable 326 and the cable sleeve 328. FIGS. 20-22 also illustrate an optional mounting flange 329 that may be attached to and extending outwardly from the peripheral wall 302A so as to attach the latch assembly 300 to a surface or a structure, for example such as the floor surface 6. Two flanges 329 may be provided.

Figures 28, 29, 30:
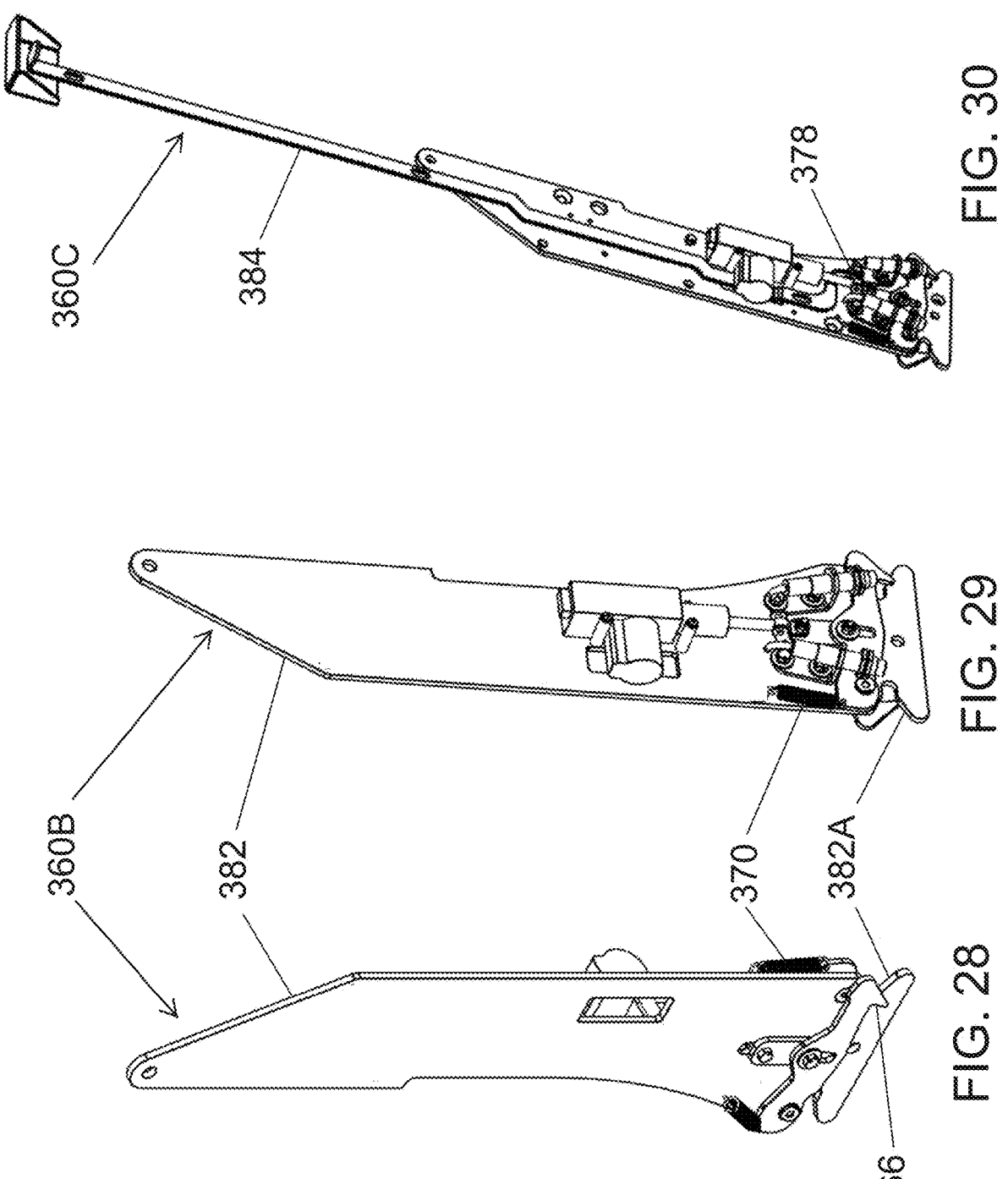
FIG. 28 illustrates a partial perspective view of the latch/unlatch actuator.
FIG. 29 illustrates a partial perspective view of the latch/unlatch actuator.
FIG. 30 illustrates a partial perspective view of the latch/unlatch actuator.

The open end of the housing 302 may be covered with a cover 316 that would generally be flush with the floor surface 6. The cover 316 will be then adapted with a slot 318, as is best illustrated in FIG. 30, to allow passage of the latch 304 during its movement between the retracted and deployed positions. As has been described above, the latch assembly 300 is designed to latch the ramp 70 in the deployed position. In other words, the latch assembly 300 may be provided in a combination with the ramp 70 and the support 20.

Figures 23, 24:
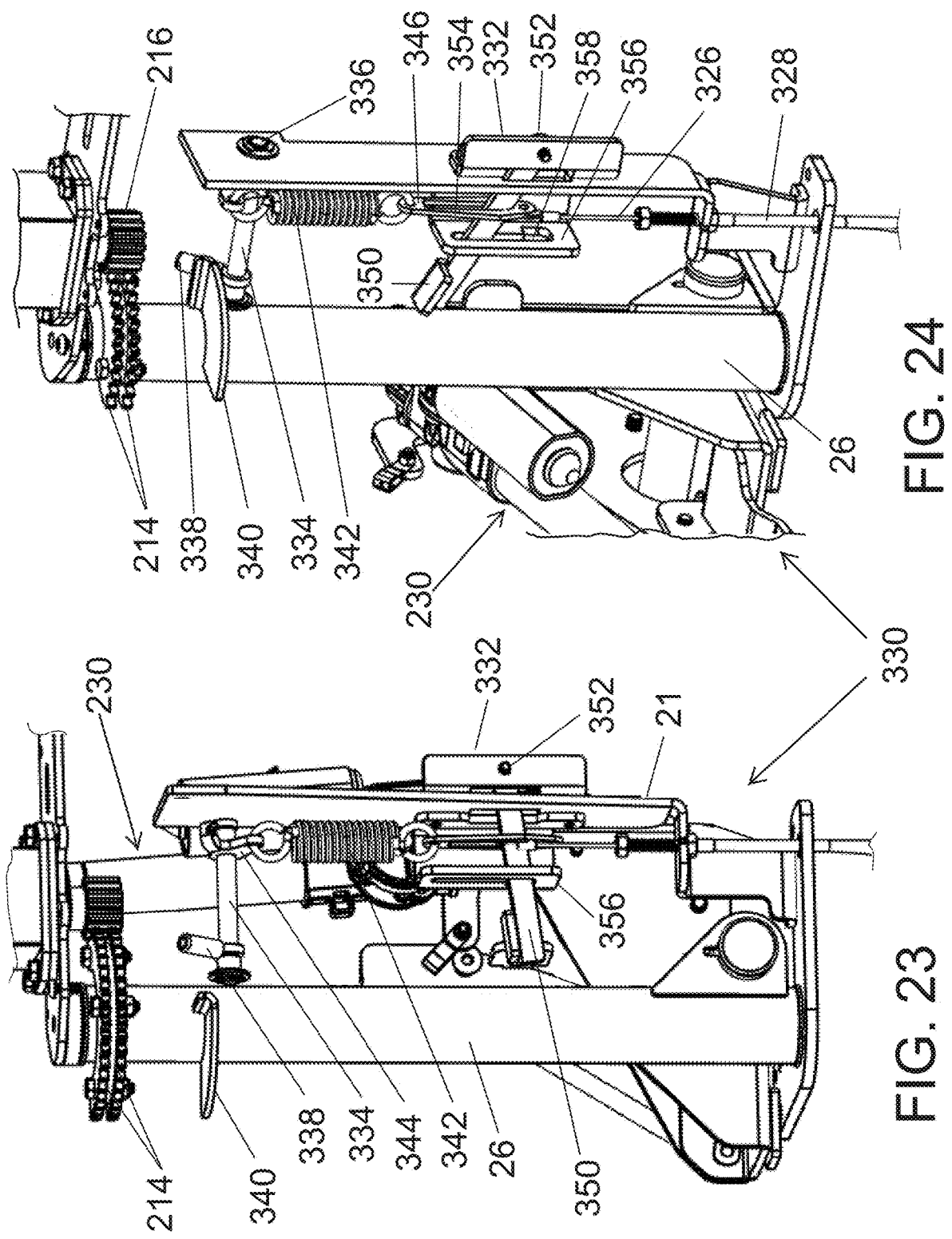
FIG. 23 illustrates a partial perspective view of the ramp assembly, particularly illustrating a latch release that can be used with the latch assembly of FIGS. 20-22.
FIG. 24 illustrates a partial perspective view the ramp assembly, particularly illustrating the latch release of FIG. 23.

FIGS. 23-24 illustrate an assembly 330 that comprises both latch actuator and a manual latch release assembly. The assembly 330 is designed to rotate the latch 304 into the deployed position through a cam action and the cable 326 and temporarily release the cable 326 when the ramp 70 is to be rotated past the deployed position. A shaft 334 is rotationally connected to a stationary portion 21 of the support 20. A force receiving element 338 is mounted on the shaft 334 for a rotating therewith. A force transmitting element 340 is mounted on the support 20 and, more particularly, on the rotating member 26 thereof. When an actuator spring 342 is provided to prevent over tensioning of the cable 326, one end of the actuator spring 342 is connected to the lever 344. The lever 344 is also attached to the shaft 334 for a rotating movement therewith. When the actuator spring 342 is not required, the cable 326 is connected to the lever 344.

To temporarily rotate the latch 304 into retracted position after the ramp 70 is rotated into deployed position, the manual latch release comprises a lever 350 that is rotationally coupled to the stationary portion 21 at a rotate 352. The link 346 is shown with the slot 354 that the lever 350 is passed through. An optional bracket 356 with a complimentary slot 358 may be also provided to guide rotating movement of the lever 350. The lever 350 may be operated by a hand. The lever 350 may be operated by a foot. The lever 350 may be referred to as a pedal.

FIG. 23 illustrates the assembly 330 when the ramp 70 is in the stowed position, where the force transmitting element 340 is disposed at a distance from the force receiving element 338. The lever 350 is illustrated as being disposed in the downward position.

FIG. 24 illustrates the assembly 330 when the ramp 70 is in one of the deployed position and the ground engaging position, where the force transmitting element 340 is engaged with the force receiving element 338 due to a rotation of the rotating member 26, thus causing rotating movement of the shaft 334. The lever 350 is in the upward position.

The latch actuator and the manual latch release assembly 330 may be also referred to as a latch operating device or a latch retracting device.

Figures 25, 26, 27:
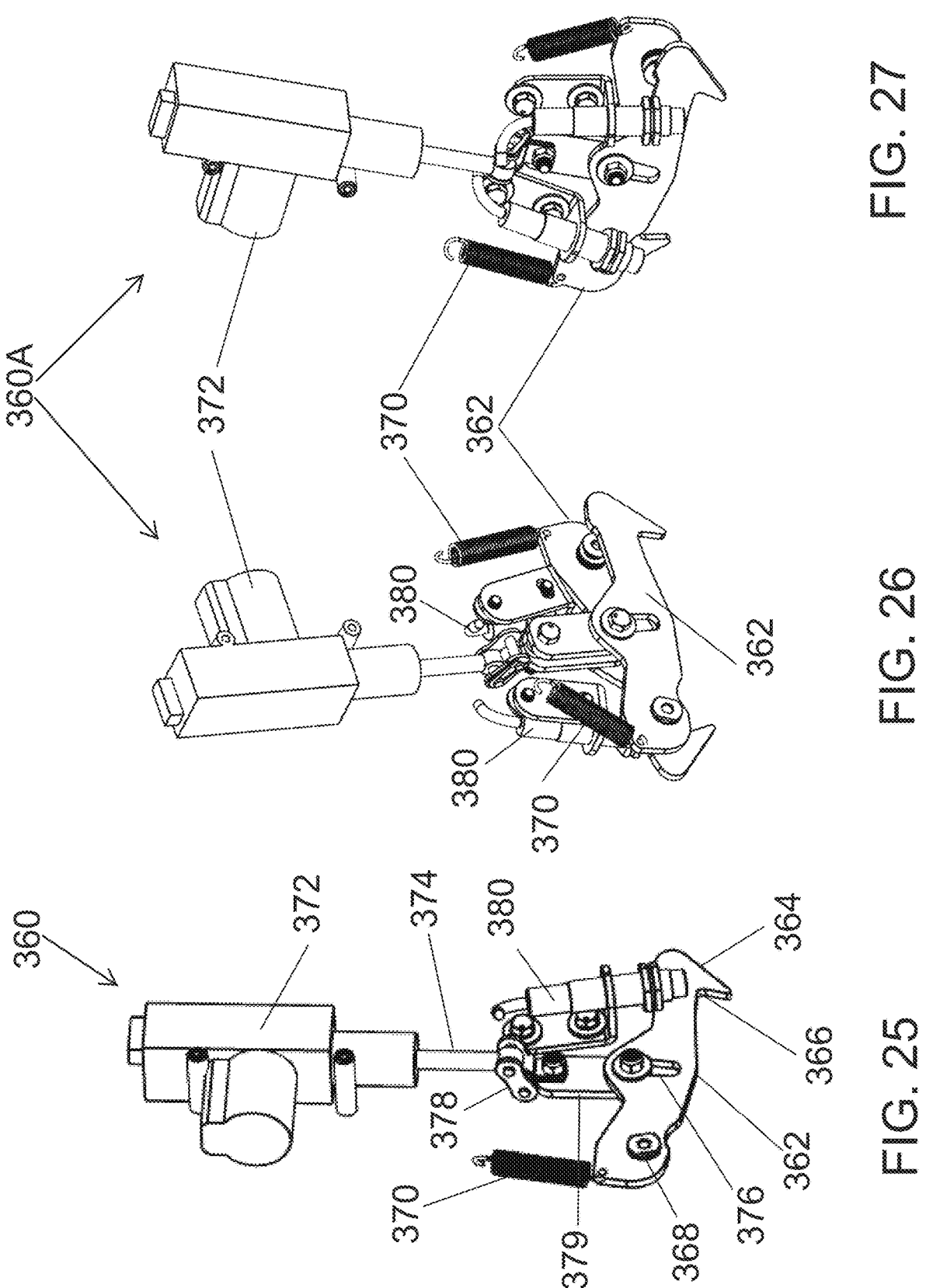
FIG. 25 illustrates a perspective view of a latch/unlatch actuator that can be used with the latch assembly of FIGS. 20-22.
FIG. 26 illustrates a perspective view of a latch/unlatch actuator that can be used with the latch assembly of FIGS. 20-22.
FIG. 27 illustrates a perspective view of a latch/unlatch actuator that can be used with the latch assembly of FIGS. 20-22.

FIG. 25 illustrates a latch/unlatch assembly 360 that is designed to selectively engage and release the latch 304, being in the deployed position, or the latch 324. The latch/unlatch assembly 360 comprises a lever 362, a rotatable or a rotational connection 368, a spring 370, an actuator 372 and a connection between the actuator 372 and the lever 362. The lever 362 is rotatable, through the connection 368, between a latched position and an unlatched position. The spring 370 biases the lever 362 into the latched position. The actuator 372 has a movable portion 374 and is designed to rotate or rotate, in a response to a control signal from the controller 180, the lever 362 into the unlatched position. The connection between the actuator 372 and the lever 362 comprises a slot 376 through a thickness of the lever 362, a link 378 that is rotatably or rotationally connected to a free end of the movable portion 374 and another link 379 that is connected to the link 378 and is coupled, for example by fastening, to the slot 376. As has been described above, when the inclined edge 364 contacts the latch 304 or the latch 324, the lever 362 rotates at the rotatable or rotational connection 368 upwardly in FIG. 27, as afforded by the slot 376, until the latch 304 or the latch 324 is received within the hook-shaped portion 366. The lever 362 is then biased by the spring 370. FIG. 27 also illustrates a sensor 380 positioned to sense the presence or the absence of the latch 304 or the latch 324 within the hook-shaped portion 366. The link 379 may be referred to as a block that is mounted for a reciprocal linear movement.

FIGS. 26-27 illustrate the latch/unlatch assembly 360A that is designed to selectively engage and release both the latch 304 and the latch 324. The latch/unlatch 360A is adapted with two levers 362 that are disposed opposite to each other and that are both connected to the free end of the movable portion 374 of the actuator 372. During operation, one lever 362 is oriented to selectively engage and release latch 304 and the other lever 362 is oriented to selectively engage and release latch 324.

FIGS. 28-29 illustrates a latch/unlatch assembly 360B that comprises the latch/unlatch assembly 360A, as described above, mounted onto a mounting element 382. The mounting element 382 may be secured to the side of the ramp 70. When ramp 70 comprises a bi-fold configuration, the mounting element 382 will be mounted to the inner ramp portion 74. The mounting element 382 may be also used with the latch/unlatch assembly 360. The mounting element comprises an edge notch that is defined in the terminal portion 382A. The notch is aligned with the hook shaped portion 366 so as to provide a space to receive and cage the latch 304 or 324 therewithin.

FIG. 30 illustrates a latch/unlatch assembly 360C that comprises the latch/unlatch assembly 360B, as described above. The latch/unlatch assembly 360C also comprises a release lever 384. The release lever 384 attaches to the link 378, next to the free end of the movable portion 374 and is designed to manually unlatch the latch 304 or the latch 324 in an event of a failure of the actuator 372. The release lever 384 may be manually moved in an upward direction in FIG. 29 to rotate the lever(s) 362 through the slot(s) 376.

Figures 31, 32, 33, 34:
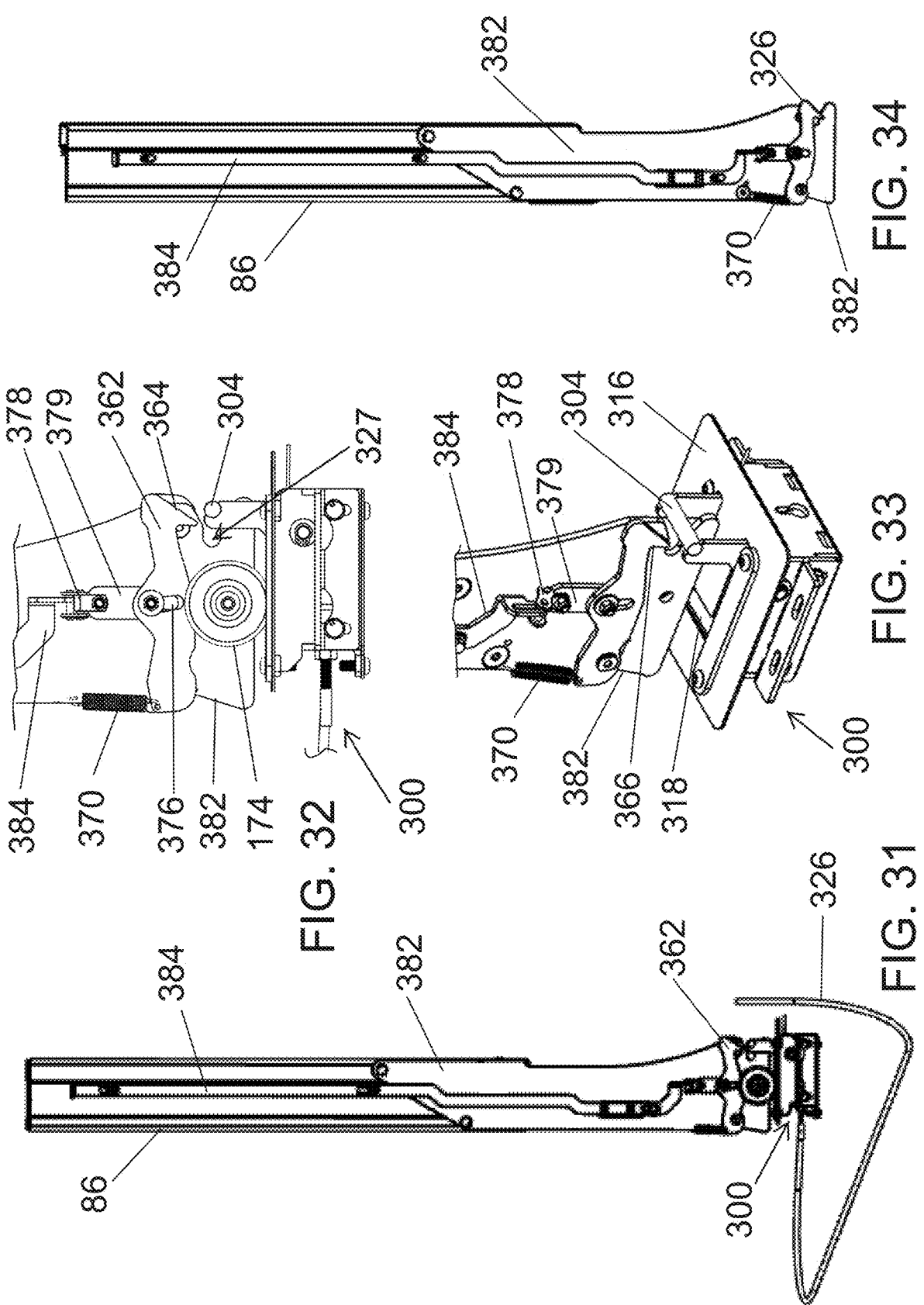
FIG. 31 illustrates an elevation view of a latch/unlatch assembly.
FIG. 32 illustrates a partial elevation view of the latch/unlatch assembly of FIG. 31.
FIG. 33 illustrates a partial perspective view of the latch/unlatch assembly of FIG. 31.
FIG. 34 illustrates an elevation view of a latch/unlatch assembly with the retractable latch assembly and cable removed for clarity.

FIG. 31 illustrates an elevation view of a latch/unlatch actuator that is configured to manually release the latch 304 by way of the handle 384, as described above. The handle 384 is attached to the side edge 86 of the ramp 70. The handle 384 is attached to the side edge 86 of the ramp 70 through a mounting plate 382.

FIG. 32 illustrates a partial elevation view of the latch/unlatch assembly of FIG. 31. Space 327 is shown to receive and cage the latch 304 therewithin with the aligned hook portion of the lever 362. The lever 362 is shown in the released position to expose the space 327. When ramp 70 approaches the latch 304, the latch 304 lifts the lever 362 through the inclined edge 364. When the latch 304 is disposed within the space 327, the spring 370 biases the hook-shaped portion 366 of the lever 362 into engagement with the latch 304.

FIG. 33 illustrates a partial perspective view of the latch/unlatch assembly of FIGS. 31-32 and the retractable latch assembly 300.

FIG. 34 illustrates an elevation view of a latch/unlatch assembly with the retractable latch assembly 300 and the cable 326 removed for clarity.

The mounting element 382 may be omitted in FIGS. 25-34 with the components of the latch/unlatch actuator being mounted directly to the edge 86 of the ramp 70.

Figure 35:
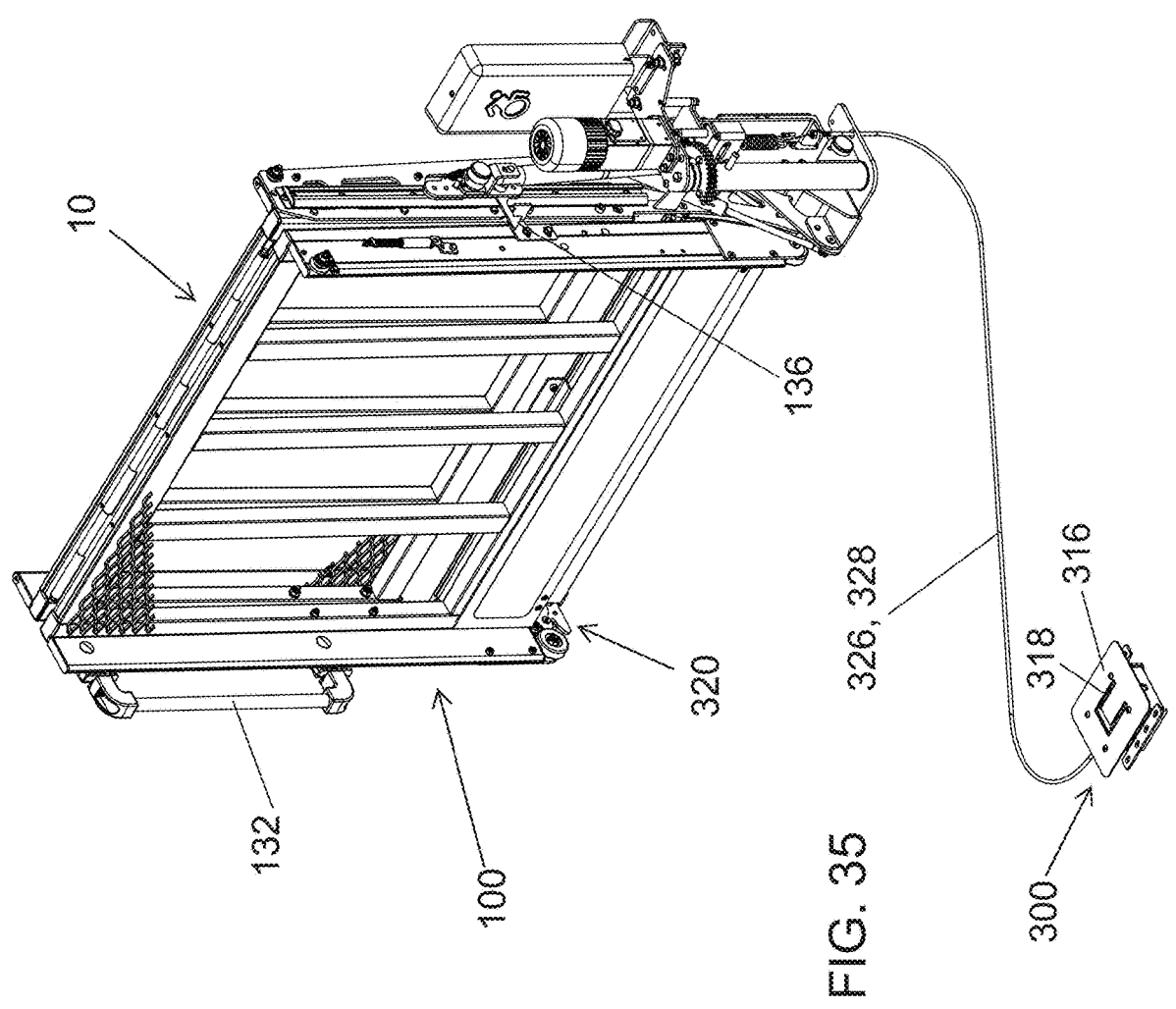
FIG. 35 illustrates a perspective view of a ramp assembly system with a ramp shown in a stowed position.

FIG. 35 illustrates a perspective view of the ramp assembly system with the ramp assembly 10, as described above, shown in a stowed position with the ramp 70 latched at the latch 324.

Figure 36:
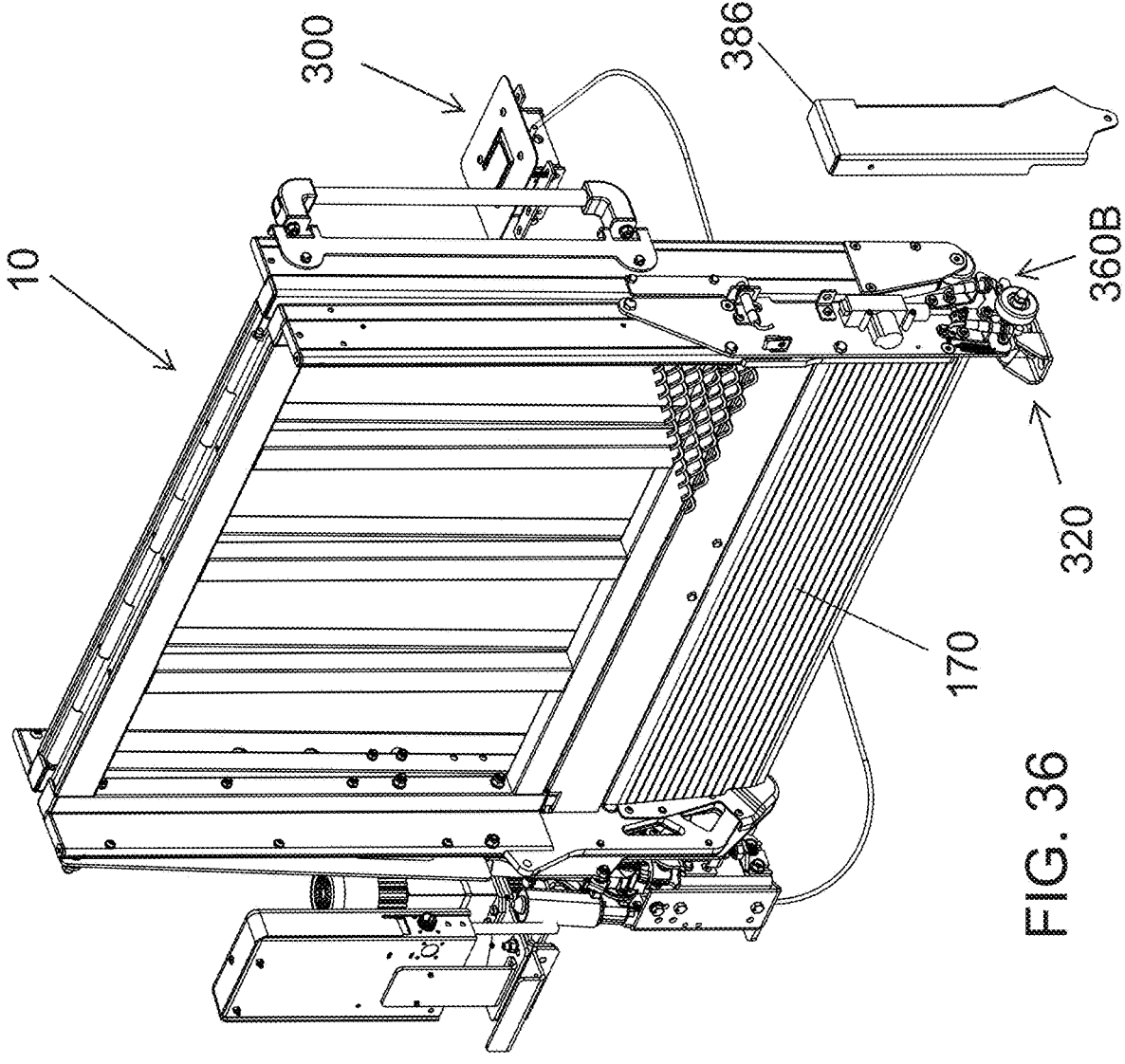
FIG. 36 illustrates a perspective view of a ramp assembly system with the ramp shown in stowed position.

FIG. 36 illustrates a perspective view of the ramp assembly system with the ramp assembly 10, as described above, shown in a stowed position with the ramp 70 latched at the latch 324.

Figure 37:
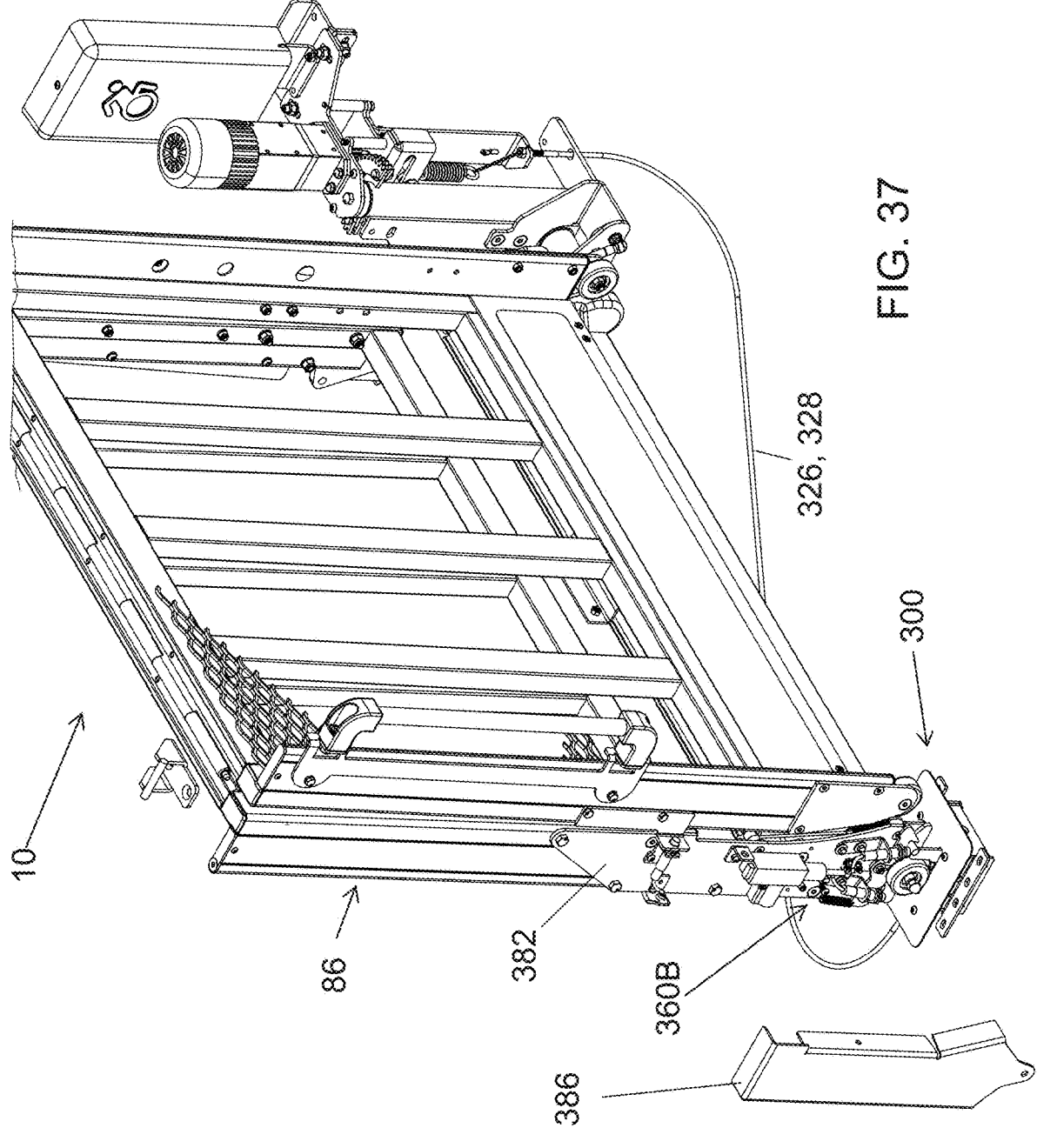
FIG. 37 illustrates a partial perspective view of a ramp assembly system with the ramp shown in a deployed position.

FIG. 37 illustrates a perspective view of a ramp assembly system with a ramp assembly 10, as described above, shown in the deployed position with the ramp 70 latched at the latch 304.

Figure 38:
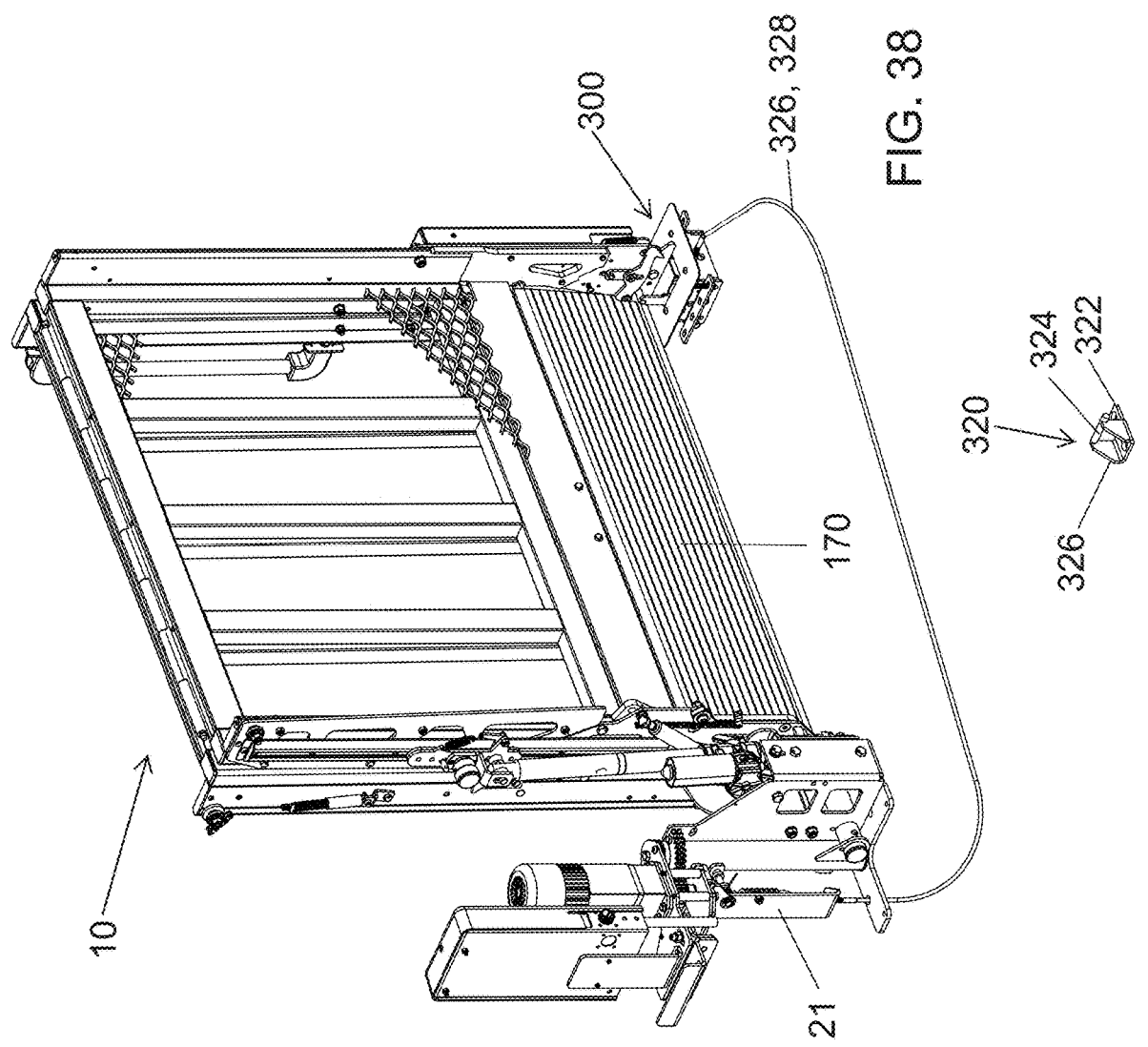
FIG. 38 illustrates a perspective view of a ramp assembly system with the ramp shown in the deployed position.

FIG. 38 illustrates a perspective view of a ramp assembly system with a ramp assembly 10, as described above, shown in the deployed position with the ramp 70 latched at the retractable latch assembly 300. The latch assembly 320 is also illustrated with a plate-shaped mounting element 322 and two flanges 326 that support the latch 324.

Figure 39:
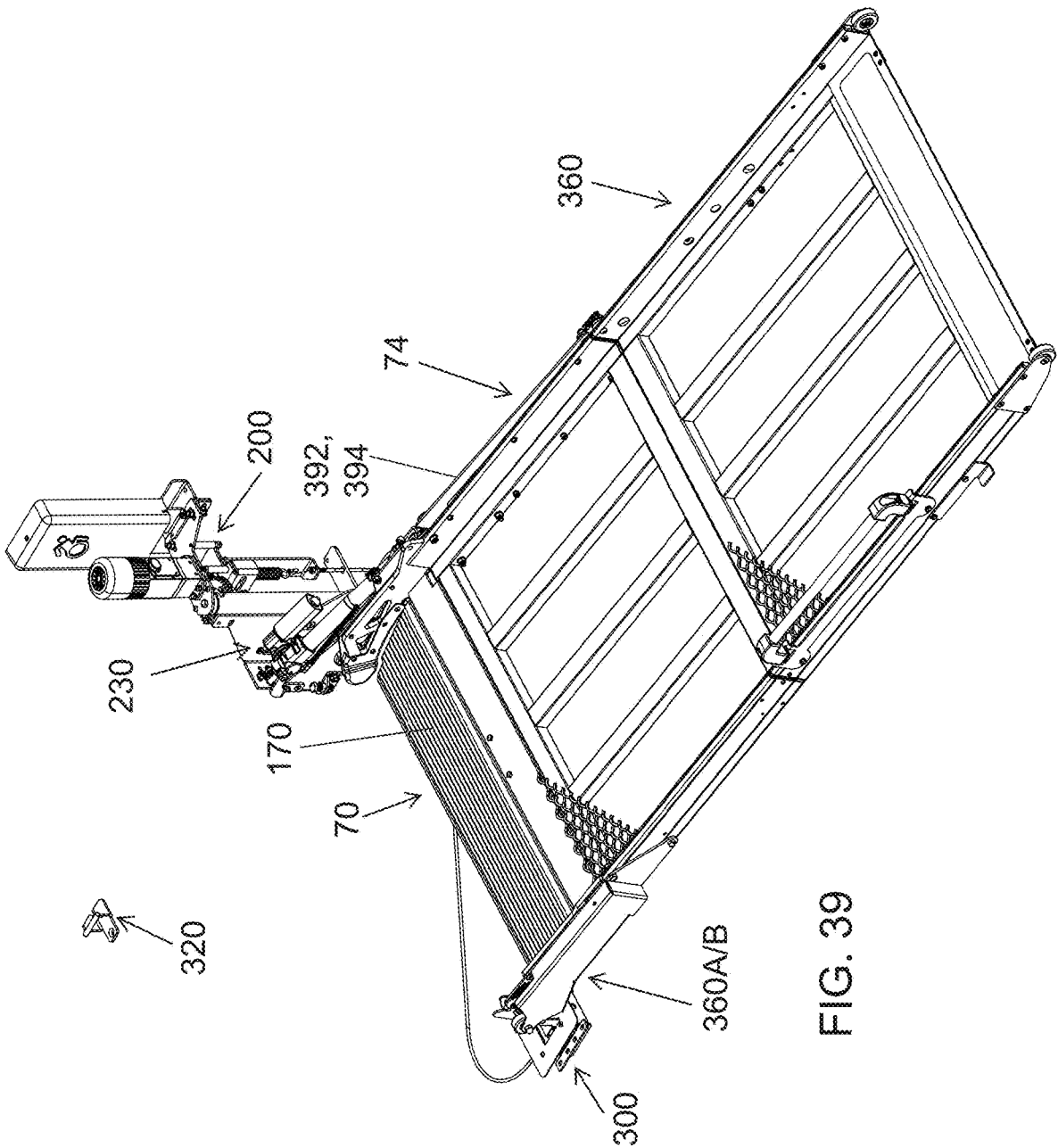
FIG. 39 illustrates a perspective view of a ramp assembly system with the ramp shown in a ground engaging position.
Figure 40:
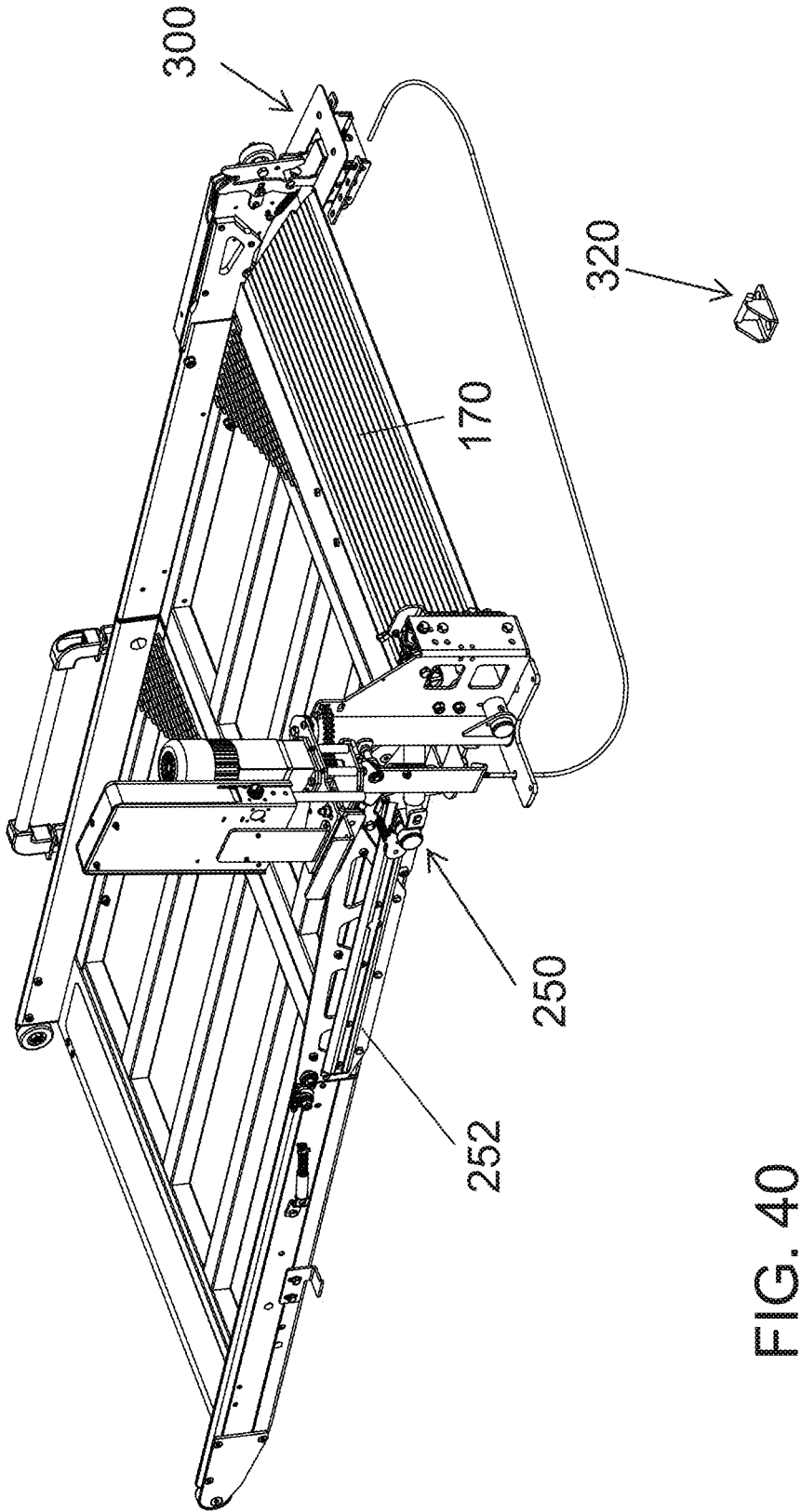
FIG. 40 illustrates a perspective view of a ramp assembly system with the ramp shown in a ground engaging position.

FIGS. 39-40 illustrate a perspective view of the ramp assembly system with the ramp assembly 10, as described above, shown in the ground engaging position. The threshold 170 rotates to provide an inclined surface between the ramp 70 and the vehicle floor 6 for ease of boarding and alighting.

FIGS. 38-40 also illustrate another latch assembly 320 that comprises a mounting element 322, configured to be stationary attached to the floor surface 6 and a latch 324 that is attached to the mounting element 322. The latch 324 may be attached at a distance from the mounting element 322 by way of one or two flanges 326. The latch assembly 320 may be used to latch the bi-fold ramp 70 in the stowed position. The latch assembly 320 may be used to latch the bi-fold ramp 70 in the deployed position. A non-bi-fold ramp 70 may be also used. The latch/unlatch assembly is also designed to operate with the latch assembly 320.

Figure 41:
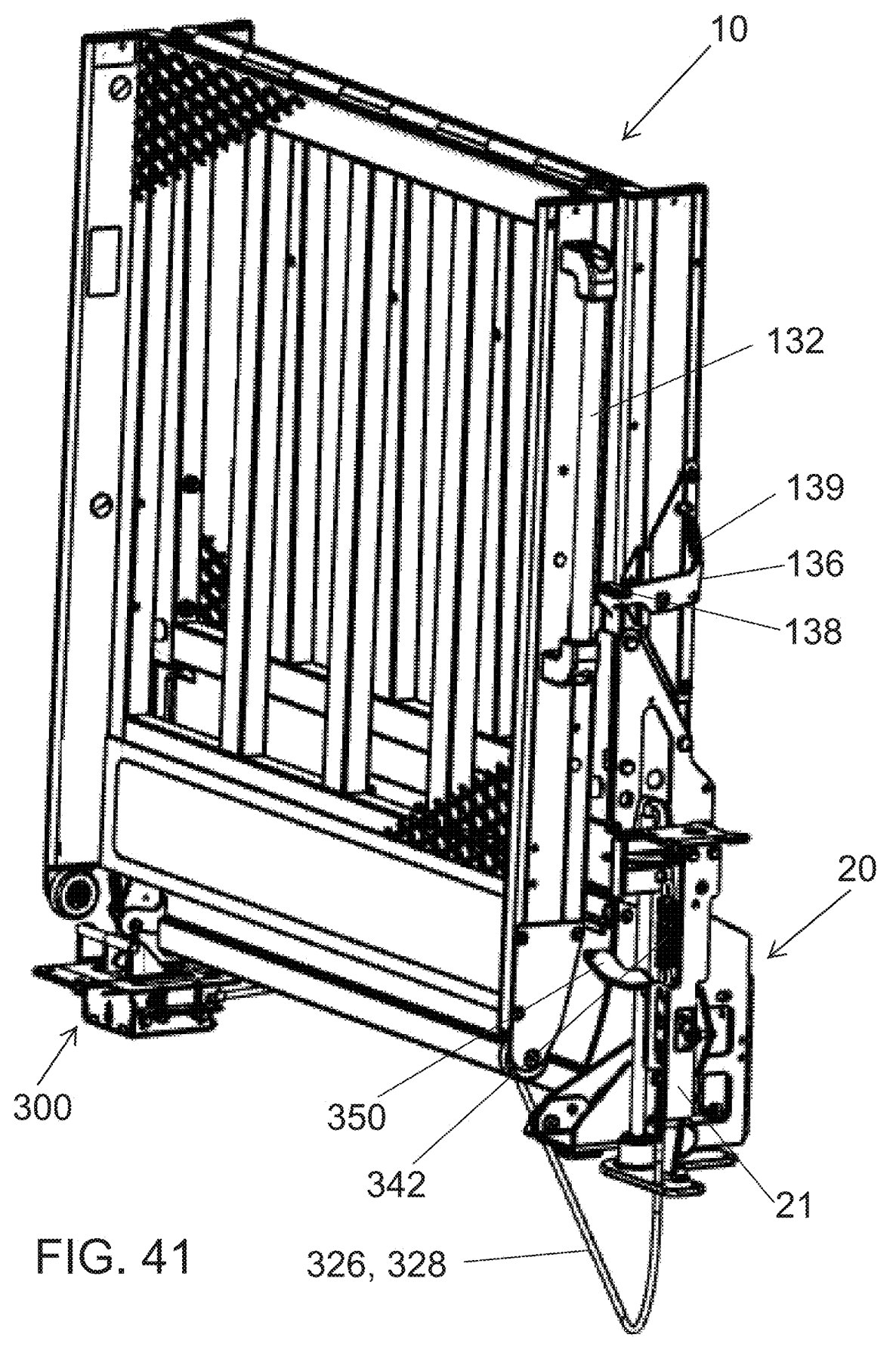
FIG. 41 illustrates a perspective view of a ramp assembly system with the ramp shown in a stowed position.

FIG. 41 illustrates a perspective view of the ramp assembly 10 with the bi-fold ramp 70 being in a deployed position. The ramp assembly 10 of FIG. 41 is configured for a manual rotation between the stowed and deployed positions. A latch (lever) 136 is attached to the edge of the ramp 70 and is biased by the spring 139 for engagement with the latch target 138. The handle 132 is illustrated as being attached to the ramp 70 adjacent the latch 136 for a one-hand operation where the operator of the ramp assembly 10 is able to lift the latch 136 in order to unlatch the outer ramp portion from the inner ramp portion and move the outer ramp portion through the handle 132 with the same hand that lifted the latch 136.

Figure 42:
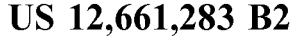
FIG. 42 illustrates a partial view of a ramp assembly installed on a vehicle and shown in a ground engaging position.

FIG. 42 illustrates a perspective view of the ramp assembly 10 installed on a vehicle 2 with the ramp assembly 10 shown in the ground engaging position. The vehicle 2 defines an interior 4, the floor surface 6 and the door 8. The door 8 is operable to selectively open and close the door opening 7. When a width of the ramp assembly 10 is dimensioned to span a width of the door opening 7, the latch assembly 320 may be used to latch the ramp 70 in the deployed position, as is shown in FIG. 42. When a width of the ramp assembly 10 is dimensioned smaller than a width of the door opening 7, the latch assembly 300, either of fixed or a retractable type, may be used to latch the ramp 70 in the deployed position.

At least some of the embodiments disclosed hereinabove may be summarized as follows.

Embodiment 1

A ramp assembly, comprising: a support, the support defining each of a vertical axis and a horizontal axis during operation of the ramp assembly; a ramp, the ramp coupled to the support during the operation of the ramp assembly, the ramp rotatable about the vertical axis and about the horizontal axis; and an actuator mechanism, the actuator mechanism being coupled to at least one of the support, the ramp, a power source and a controller, the actuator mechanism configured, in a response to a control signal from the controller or in a response to a manual force, to rotate the ramp about the vertical axis between a stowed position and a deployed position.

Embodiment 2

The ramp assembly of embodiment 1, wherein the support comprises: a first rotate component, the first rotate component configured to be mounted to a supporting structure, the first rotate component providing the vertical axis; a second rotate component, the second rotate component being coupled to the first rotate component and to the ramp, the second rotate component providing the horizontal axis; and an arm, the arm coupled to each of the second rotate component and the ramp.

Embodiment 3

The ramp assembly of embodiment 2, wherein the first rotate component comprises: a shaft, the shaft being secured to the supporting structure during the operation of the ramp assembly; and a member, the member comprising a hollow interior, the hollow interior being sized and shaped to receive the shaft therewithin and allow the ramp to be rotated between the stowed position and the deployed positions.

Embodiment 4

The ramp assembly of embodiment 3, wherein the first rotate component further comprises a bearing, the bearing disposed between a surface of the hollow interior and a peripheral surface of the shaft.

Embodiment 5

The ramp assembly of embodiment 3, wherein the first rotate component further comprises two bearings, each bearing from the two bearings being disposed, at each end of the shaft, between a surface of the hollow interior and a peripheral surface of the shaft.

Embodiment 6

The ramp assembly of embodiment 2, wherein the second rotate component comprises: a shaft, the shaft secured to a portion of the first rotate component during the operation of the ramp assembly; a member, the member comprising a hollow interior, the hollow interior being sized and shaped to receive the shaft therewithin and allow the ramp to be rotated about the horizontal axis.

Embodiment 7

The ramp assembly of embodiment 6, wherein the second rotate component further comprises a bearing, the bearing disposed between a surface of the hollow interior and a peripheral surface of the shaft.

Embodiment 8

The ramp assembly of embodiment 6, wherein the second rotate component further comprises two bearings, each bearing from the two bearings being disposed, at each end of the shaft, between a surface of the hollow interior and a peripheral surface of the shaft.

Embodiment 9

The ramp assembly of embodiment 1, wherein the actuator mechanism comprises: a first gear, the first gear secured on the support; an actuator, the actuator comprising a stationary portion and a movable portion extending from the stationary portion; and a second gear, the second gear secured to a free end of the movable portion, the second gear engages the first gear during the operation of the ramp assembly.

Embodiment 10

The ramp assembly of embodiment 9, wherein the actuator mechanism further comprises a planetary gearbox disposed between the actuator and the first gear, the planetary gearbox being coupled to an output shaft of the actuator, the first gear being coupled to an output shaft of the planetary gearbox.

Embodiment 11

The ramp assembly of embodiment 10, wherein the planetary gearbox comprises a ratio of planetary reduction being sufficient to manually overcome the actuator and manually rotate the ramp.

Embodiment 12

The ramp assembly according to any preceding embodiments, wherein the actuator mechanism configured to rotate the ramp between a deployed position and a ground engaging position.

Embodiment 13

The ramp assembly according to any preceding embodiments, wherein the actuator mechanism comprises: an actuator, the actuator comprising an actuator portion reciprocally movable in a linear direction between extended and retracted positions; a rotational connection between the actuator and a stationary portion within the ramp assembly; and a rotational connection between a free end of the actuator portion and the ramp; the actuator portion extending, in a response to a control signal from the controller, to rotate the ramp from a deployed position into a ground engaging position; the actuator portion retracting, in a response to another control signal from the controller, to rotate the ramp from the ground engaging position into the deployed position.

Embodiment 14

The ramp assembly of embodiments 1-12, wherein the actuator mechanism comprises:

an actuator, the actuator comprises a rotational connection with a stationary portion within the ramp assembly, a movable portion, and a rotational connection between a free end of the movable portion and the ramp, the movable portion extending, in a response to a control signal from the controller, to rotate the ramp from the deployed position into the ground engaging position, the movable portion configured to retract, in a response to another control signal from the controller, and to rotate the ramp from the ground engaging position into the deployed position.

Embodiment 15

The ramp assembly of embodiments 1-12, further comprising a release mechanism configured to selectively couple and decouple the movable portion from the ramp and enable a manual rotation of the ramp between the deployed position and the ground engaging position.

Embodiment 16

The ramp assembly according to embodiment 15, wherein the release mechanism comprises: a track on one a side of the ramp; a sliding portion that reciprocally slides within the track; a recess in the track; a pin engaged within the recess, the pin extending outwardly from the side of the ramp; and a knob connected to a free end of the pin; the knob manually operable to selectively move the pin away from the recess and allowing the free end of the movable portion to slide along the one side of the ramp and return the pin into an engagement with the recess and preventing the movable portion to slide along the one side of the ramp.

Embodiment 17

The ramp assembly of embodiments 1-16, further comprising a damper, the damper attached to each of the support and the ramp to counterbalance a rotational movement of the ramp between the deployed position and the ground engaging position.

Embodiment 18

The ramp assembly of embodiments 1-12, wherein the ramp comprises: an inner ramp portion coupled at one side thereof to the support; an outer ramp portion; and a hinge connecting the outer ramp portion to the inner ramp portion; the outer ramp portion and the inner ramp portion movable between a folded position where the outer ramp portion being disposed in a surface-to-surface facing arrangement with the inner ramp portion and an unfolded position where the outer ramp portion being disposed in an end-to-end facing arrangement with the inner ramp portion.

Embodiment 19

The ramp assembly of embodiment 18, wherein the actuator mechanism comprises: an actuator, the actuator comprising an actuator portion reciprocally movable in a linear direction between extended and retracted positions; a rotational connection between the actuator and a stationary portion within the ramp assembly; a rotational connection between a free end of the actuator portion and the inner ramp portion; and a tension assembly, the tension assembly coupling the outer ramp portion to the inner ramp portion; the actuator portion extending, in a response to a control signal from the controller, to rotate the ramp from the deployed position into the ground engaging position; the actuator portion configured to retract, in a response to another control signal from the controller, and to rotate the ramp from the ground engaging position into the deployed position.

Embodiment 20

The ramp assembly of embodiment 19, further comprising a latch assembly, the latch assembly selectively latching the inner and outer ramp portions in the folded position and releasing the outer ramp portion from the inner ramp portion prior to a rotational movement of the inner and outer ramp portions into the unfolded position.

Embodiment 21

The ramp assembly of embodiment 20, wherein the latch assembly comprises: a latch lever; a rotational connection between the latch lever and the inner ramp portion; a latch on the outer ramp portion; the latch lever being in a releasable engagement with the latch when the inner and outer ramp portions are in the folded position.

Embodiment 22

The ramp assembly of embodiment 21, further comprising a spring, the spring mounted to bias the lever into the releasable engagement with the latch.

Embodiment 23

The ramp assembly of embodiment 1, further comprising a latch/unlatch mechanism, the latch/unlatch mechanism comprising: a first lever, the first lever being in a first rotational connection with the ramp, the first lever rotatable between latched and unlatched positions; a first spring, the first spring biases the first lever into a latched position; a second lever, the second lever being in a second rotational connection with the ramp, the second lever rotatable between latched and unlatched positions; a second spring, the second spring biases the second lever into a latched position; an actuator; and a connection between the actuator and each of the first and second levers; the first and second levers rotate, through the connection, into unlatched positions in a response to actuation of the actuator.

Embodiment 24

The ramp assembly of embodiment 23, wherein the connection comprises: a first link, the first link being in a rotational connection with a free end of the actuator; and a second link, the second link being in a rotational connection with the first link, the second link being in a sliding connection with each of the first lever and the second lever.

Embodiment 25

The ramp assembly of embodiment 23, wherein the connection comprises: a link; and a block, the block coupled to the link, the block mounted for a reciprocal linear movement between two positions; the block contacts each of the first and second levers in a response to the first and second levers rotating into the unlatched positions.

Embodiment 26

The ramp assembly of embodiment 25, further comprising a mounting element, the block contacts a slot in the mounting element.

Embodiment 27

The ramp assembly of embodiment 23, wherein the actuator comprises a stationary portion coupled to the ramp and a movable portion extending from the stationary portion, the connection is between the movable portion of the actuator and the first and second levers, the actuator being coupled to each of the power source and the controller, the actuator operable, in a response to a control signal from the controller, to move the movable portion in a linear direction.

Embodiment 28

The ramp assembly of embodiment 23, wherein the actuator comprises a bidirectional electric motor.

Embodiment 29

The ramp assembly of embodiment 23, wherein the actuator comprises a cable.

Embodiment 30

The ramp assembly of embodiment 23, wherein the actuator comprises a lever.

Embodiment 31

The ramp assembly of embodiment 23, further comprising a latch assembly selectively latching the ramp, being in the stowed position, to a stationary structure and unlatching the ramp from the stationary structure.

Embodiment 32

The ramp assembly of embodiment 31, wherein the latch assembly comprises: a latch, the latch mounted stationary adjacent the ramp being in the stowed position; a lever, the lever being in a rotational connection with the inner ramp and in a releasable engagement with the latch when the ramp being in the stowed position; and an actuator, the actuator coupled to each of the ramp, the lever, a controller and a power source, the actuator operable, in a response to a control signal from the controller, to at least rotate the lever to release the latch.

Embodiment 33

The ramp assembly of embodiment 32, further comprising a spring, the spring biases the lever into the releasable engagement with the latch when the ramp being in the stowed position.

Embodiment 34

The ramp assembly of embodiments 23-33, further comprising a latch assembly selectively latching the ramp, being in the deployed position, to a stationary structure and unlatching the ramp from the stationary structure.

Embodiment 35

The ramp assembly of embodiment 34, wherein the latch assembly comprises: a latch, the latch mounted for a rotational movement adjacent the ramp being in the deployed position; a lever, the lever being in a rotational connection with the ramp and in a releasable engagement with the latch being in a deployed position, the lever comprising a hook-shaped portion, the hook-shaped portion configured to selectively engage the latch; a spring, the spring biases the lever to engage the latch being in the deployed position; and a connection between the latch and an external actuating or deactuating force.

Embodiment 36

The ramp assembly of embodiment 35, wherein the connection comprises a cable.

Embodiment 37

The ramp assembly according to embodiment 35, further comprising: a shaft; a rotational connection between one end of the shaft and a stationary structure; a force receiving element, the force receiving element mounted on the shaft for a rotational movement therewith; a lever, the lever mounted on the shaft for the rotational movement therewith; and a spring, the spring having one end connected to the lever; a cable, the cable connected at one end thereof to an opposite end of the spring and connected at another end thereof to the connection; the spring configured to pull the cable in one direction in a response to a shaft rotation due to a force received by the force receiving element when the ramp from rotates from the stow position into the deployed position, the spring configured to release the cable to move in an opposite direction when the force is no longer received by the force receiving element due to a rotation of the ramp from the deployed position into the stow position; the latch configured to rotate into a latch deployed position when the spring pulls the cable; the latch configured to rotate from the latch deployed position when the spring releases the cable.

Embodiment 38

The ramp assembly according to embodiment 37, further comprising: a link, the link disposed between and connected to the spring and the cable, the link having a slot through a thickness of the link, the spring connected to the cable through the link; another lever, the another lever passed through the slot; and another rotational connection between one end of the another lever and the stationary structure; the another lever rotatable in one direction when the spring pulls the cable, the lever rotatable in an opposite direction when the spring releases the cable; the another lever rotatable in the opposite direction when a force is applied to an opposite end of the another lever.

Embodiment 39

The ramp assembly of embodiment 35, further comprising: a shaft; a rotational connection between one end of the shaft and a stationary structure; a force receiving element, the force receiving element mounted on the shaft for a rotational movement therewith; a lever, the lever mounted on the shaft for the rotational movement therewith; and a cable, the cable connected at one end thereof to the lever and connected at another end thereof to the connection; the lever configured to pull the cable in one direction in a response to a shaft rotation due to a force received by the force receiving element when the ramp from rotates from the stow position into the deployed position, the lever configured to release the cable to move in an opposite direction when the force is no longer received by the force receiving element due to a rotation of the ramp from the deployed position into the stow position; the latch configured to rotate into a latch deployed position when the spring pulling the cable; the latch configured to rotate from the latch deployed position when the spring releases the cable.

Embodiment 40

The ramp assembly of embodiment 1, wherein the actuator mechanism is configured to rotate the ramp between the deployed and the ground engaging positions and wherein the ramp assembly further comprises a manual release assembly configured to selectively couple and uncouple the actuator mechanism from the ramp, the manual release assembly comprising: a track on a side edge of the ramp; a guide received within the track for a reciprocal linear movement therewithin, the guide being coupled to an end of an actuator within the actuator mechanism; a recess in the track; a pin, the pin having one end thereof being in an engagement within the recess; and a knob, the knob coupled to an opposite end of the pin; the knob manually operable to move the pin away from the engagement with the recess to allow a sliding movement of the end of the actuator along the side edge of the ramp when the ramp being manually rotated between the deployed and ground engaging position.

Embodiment 41

The ramp assembly according to embodiment 1, wherein the ramp comprises an inner ramp portion and an outer ramp portion, the outer ramp portion being hingeably connected to the inner ramp portion and wherein the ramp assembly further comprises a fold latch, the fold latch comprising: a target on a side edge of the outer ramp portion; a lever in a rotational connection with an actuator in the actuator mechanism, the lever comprising a hook shaped portion, the hook shaped portion shaped to engage the target therewithin when the outer ramp portion is in a surface-to-surface relationship with the inner ramp portion; the lever movable by the actuator to disengage the target during an initial movement of the actuator before the outer ramp portion moves away from the inner ramp portion.

Embodiment 42

A method of using a bifold ramp, the method comprising: unlatching the bifold ramp, disposed in a folded stowed position, with a first lever in a latch actuator in a response to a deploy signal from a controller, a fixed latch target in a stowed latch assembly; rotating the bifold ramp, with a rotate actuator mechanism, from the folded stowed position into a folded deployed position; rotating a latch in a latch assembly, with a cable coupled to the latch and to the rotate actuator mechanism, into a latch deployed position; latching the bifold ramp at the latch with a second lever in the latch actuator; and unfolding, with a fold/unfold mechanism in a response to an unfold signal from the controller, the bifold ramp from the folded deployed position into an unfolded ground engaging position.

Embodiment 43

A method of stowing a deployed bifold ramp, the method comprising: folding, with a fold/unfold actuator mechanism in a response to a fold signal from a controller, the bifold ramp from an unfolded ground engaging position into a folded deployed position; unlatching the bifold ramp, with a first lever in a latch actuator in a response to a stowed signal from a controller, a movable latch target in a deployed latch assembly; rotating the bifold ramp, with a rotate actuator mechanism, between the folded deployed position and a folded stowed position; rotating the movable latch target in the deployed latch assembly, with a cable coupled to the movable latch target and to the rotate actuator mechanism, into a retracted position; and latching the bifold ramp in the folded stowed position with a second lever in the latch actuator engaging a fixed latch target in a stowed latch assembly.

Embodiment 44

A ramp assembly, comprising: a support, the support configured to be mounted to a supporting structure, the support defining a vertical axis; a ramp, comprising: a first ramp portion coupled at one side thereof to the support, a second ramp portion, and a hinge connecting the second ramp portion to the first ramp portion, the second ramp portion and the first ramp portion movable between a first position where the second ramp portion being disposed in a surface-to-surface facing arrangement with the first ramp portion and a second position where the second ramp portion being disposed in an end-to-end facing arrangement with the first ramp portion; a first actuator mechanism, the first actuator mechanism being coupled to the support and to the ramp, the first actuator mechanism configured to rotate the ramp in a vertical plane about the vertical axis between two terminal positions; a second actuator mechanism, the second actuator mechanism being coupled to the ramp, the second actuator mechanism configured to move the first and second ramp portions between the first and second positions; a third actuator mechanism, the third actuator mechanism being coupled to the ramp, the third actuator mechanism configured to selectively engage and release a latch; and a control system, the control system configured to at least sense positions of the ramp and selectively actuate and deactuate each of the first, second and third actuator mechanisms.

Embodiment 45

A ramp assembly, comprising: a support, the support configured to be mounted to a supporting structure, the support defining a vertical axis; a ramp comprising: a first ramp portion coupled at one side thereof to the support, a second ramp portion, and a hinge connecting the second ramp portion to the first ramp portion, the second ramp portion and the first ramp portion movable between a folded stowed position where the second ramp portion being disposed in a surface-to-surface facing arrangement with the first ramp portion and an unfolded deployed position where the second ramp portion being disposed in an end-to-end facing arrangement with the first ramp portion; a first actuator mechanism, the first actuator mechanism being coupled to the support and to the ramp, the first actuator mechanism configured to rotate the ramp in a vertical plane about the vertical axis between two terminal positions; a second actuator mechanism, the second actuator mechanism being coupled to the ramp, the second actuator mechanism configured to move the first and second ramp portions between the folded stowed position and the unfolded deployed position; and a control system, the control system configured to at least sense positions of the ramp and selectively actuate and deactuate each of the first and second actuator mechanisms.

Embodiment 46

A ramp assembly, comprising: a support, the support configured to be mounted to a supporting structure, the support defining a vertical axis; a ramp comprising: a first ramp portion coupled at one side thereof to the support, a second ramp portion, and a hinge connecting the second ramp portion to the first ramp portion, the second ramp portion and the first ramp portion movable between a folded stowed position where the second ramp portion being disposed in a surface-to-surface facing arrangement with the first ramp portion and an unfolded deployed position where the second ramp portion being disposed in an end-to-end facing arrangement with the first ramp portion; and an actuator mechanism, the actuator mechanism being coupled to the support and to the ramp, the actuator mechanism configured, in a response to a control signal, to rotate the ramp in a vertical plane about the vertical axis.

Embodiment 47

A latch assembly, comprising: a latch; and a latch mounting element, the latch mounting element configured to position the latch at a distance from a mounting structure.

Embodiment 48

The latch assembly of embodiment 47, wherein the latch mounting element comprises a plate-shaped member configured to be attached to the mounting structure and two latch flanges extending from the plate-shaped member, the latch attached to a distal end of each latch flange, the latch disposed in a plane being parallel to a plane of the plate-shaped member.

Embodiment 49

The latch assembly of embodiment 47, wherein the latch mounting element comprises: a housing, the housing comprises: a peripheral wall defining a hollow interior and an open end, and a mounting flange extending outwardly from the peripheral wall; the latch mounted for a rotation between a retracted position where the latch is disposed within the hollow interior and a deployed position where the latch extends through the open end past an edge of the peripheral wall.

Embodiment 50

The latch assembly of embodiment 49, wherein the latch assembly comprises a latch shaft rotatably attached to the peripheral wall, the latch attached to the latch shaft for the rotation therewith.

Embodiment 51

The latch assembly of embodiment 50, further comprising a spring, the spring configured and attached to bias the latch into the retracted position.

Embodiment 52

The latch assembly of embodiment 50, further comprising a spring, the spring configured to encircle a portion of the latch shaft and to bias the latch into the retracted position.

Embodiment 53

The latch assembly of embodiment 49, wherein the mounting flange comprises two mounting flanges, each mounting flange extending outwardly from the peripheral wall.

Embodiment 54

The latch assembly of embodiment 49, wherein the latch comprises: a latch shaft rotatably attached to the peripheral wall; and two springs disposed at a first distance from each other, each spring from the two springs configured to encircle a portion of the latch shaft; and two latch flanges disposed at a second distance from each other, each latch flange having a proximal edge attached to the latch shaft; the latch attached to a distal end of each latch flange for the rotation with the latch shaft.

Embodiment 55

The latch assembly of embodiment 54, further comprising a cable arm attached to the latch shaft for the rotation therewith and an actuating cable attached to the latch to rotate the latch into the deployed position and allow the rotation of the latch into the retracted position.

Embodiment 56

The latch assembly of embodiment 55, further comprising a connection with a latch operating device, the connection configured to allow the latch operating device to rotate the latch from the retracted position into the deployed position.

Embodiment 57

The latch assembly of embodiment 56, further comprising the latch operating device, the latch operating device comprising: a shaft mounted for a rotational movement; a force receiving element, the force receiving element mounted on the shaft for the rotational movement therewith; a lever, the lever mounted on the shaft for the rotational movement therewith; and an operating spring, the operating spring having one end connected to the lever, the operating spring having another end thereof connectable to a cable.

Embodiment 58

The latch assembly of embodiment 57, further comprising the cable, wherein the operating spring configured to pull the cable in one direction when the shaft rotates due to a force received by the force receiving element, the operating spring being further configured to allow the cable to move in an opposite direction when the force is no longer received by the force receiving element.

Embodiment 59

The latch assembly of embodiment 57, further comprising a ramp support, the ramp support defining each of a vertical axis and a horizontal axis, the shaft attached for the rotational movement to a stationary portion of the ramp support.

Embodiment 60

The latch assembly of embodiment 59, further comprising a ramp, the ramp configured to attach to the ramp support, the ramp configured to rotate about the vertical axis and about the horizontal axis.

Embodiment 61

The latch assembly of embodiment 59, further comprising a latch release, the latch release comprising link attached to the operating spring, an elongated slot through a thickness of the link and a latch release lever rotationally attached to a stationary portion of the ramp support and passed through the elongated slot.

Embodiment 62

The latch assembly of embodiment 49, further comprising a latching and release mechanism, the latching and release mechanism comprising: a mounting element, the mounting element comprising two edge notches; a first lever comprising a first latch engaging portion aligned with one edge notch from the two edge notches, the first lever rotatable, in a first rotational connection with the mounting element between a first latched position and a first unlatched position; a first spring, the first spring biases the first lever into the first latched position; a second lever comprising a second latch engaging portion aligned with another edge notch from the two edge notches, the second lever rotatable in a second rotational connection with the mounting element between a second latched position and a second unlatched position; a second spring, the second spring biases the second lever into the second latched position; and a handle mounted for a slidable movement about the mounting element, the handle further mounted in a rotational connection with each of the first lever and the second lever, the handle configured to move the first lever into the first unlatched position and move the second lever into the second unlatched position.

Embodiment 63

The latch assembly of embodiment 49, further comprising a latching and release mechanism, the latching and release mechanism comprising: a notch; a lever comprising a latch engaging portion aligned with the notch, the lever rotatable, in a rotational connection between a first latched position and a first unlatched position; a spring, the spring configured to bias the lever into the first latched position; and a handle, the handle in a rotational connection with the lever, the handle configured to move the lever into the unlatched position.

Embodiment 64

A latch assembly, comprising: a latch, the latch comprising: a housing, the housing comprises a peripheral wall defining a hollow interior and an open end, the peripheral wall comprises a cable access, a latch shaft, the latch shaft mounted for a rotation within the hollow interior, a latch lever, the latch lever attached to the latch shaft for the rotation therewith between a retracted position where the latch lever is disposed within the hollow interior and a deployed position where the latch lever extends through the open end past an edge of the peripheral wall, a cable arm attached to the latch shaft opposite the latch lever, and two latch springs, each latch spring from the two latch springs configured to encircle a portion of the latch shaft at each end of the latch lever, the each latch spring configured to bias the latch lever into the retracted position; a cable, the cable comprising one end thereof attached to the cable arm; a latch operating mechanism, the latch operating mechanism comprising: a shaft mounted for a rotational movement, a force receiving element, the force receiving element mounted on the shaft for the rotational movement therewith, an operating lever, the operating lever mounted on the shaft for the rotational movement therewith, and an operating spring, the operating spring having one end connected to the operating lever, the operating spring having another end thereof connectable to an opposite end of the cable, the latch operating mechanism configured to tension the cable in a response to a rotation of the shaft in a first direction and to rotate the latch lever into the deployed position; and a latching and release mechanism, the latching and release mechanism comprising: a lever comprising a latch engaging portion, the lever rotatable, in a rotational connection between a first latched position and a first unlatched position, a spring, the spring biases the lever into the first latched position, and a handle, the handle in a rotational connection with the lever, the handle configured to move the lever into the unlatched position.

Embodiment 65

The latch assembly of embodiment 64, further comprising a ramp assembly with a support and a ramp mounted on the support for a rotation between a stowed position and a deployed position, the latch assembly being disposed remotely from the ramp assembly, the latch operating mechanism coupled to the support, the latching and release mechanism attached to an edge of the ramp.

Embodiment 66

A latch assembly, comprising: a first lever comprising a first latch engaging portion, the first lever rotatable, in a first rotational connection between a first latched position and a first unlatched position; a first spring, the first spring biases the first lever into the first latched position; a second lever comprising a second latch engaging portion, the second lever being in a second rotational connection, the second lever rotatable between a second latched position and a second unlatched position; a second spring, the second spring biases the second lever into the second latched position; an actuator; and a connection between the actuator and each of the first and second levers; the actuator configured to rotate the first and second levers through the connection into corresponding unlatched positions.

Embodiment 67

A latch assembly, comprising: a lever, the lever rotatable, through a rotational connection, between a latched position and an unlatched position; a spring, the spring mounted to bias the lever into the latched position; an actuator; and a connection between the actuator and the lever; the actuator configured to rotate the lever through the connection into the unlatched position.

Embodiment 68

An actuator override device for a bifold ramp with two ramp portions connected therebetween with a hinge, the actuator override device configured to fold and unfold the two ramp portions, the actuator override device comprising; a track, the track configured to be attached to a side edge of one ramp portion from the two ramp portions; a sliding member that reciprocally slides within the track; a recess in the track; a pin engaged within the recess, the pin extending outwardly from the side edge of the one ramp portion; and a knob connected to a free end of the pin; the knob manually operable to selectively move the pin away from the recess and allowing a free end of the actuator to slide along the side edge and return the pin into an engagement with the recess and preventing the free end to slide along the side edge; the free end of the actuator being rotationally connectable to the pin.

Embodiment 69

An actuator override device, the actuator override device configured to rotate a ramp about a horizontal axis during operation of the ramp, the actuator override device comprising; a track, the track configured to be attached to a side edge of the ramp; a sliding member that reciprocally slides within the track; a recess in the track; a pin engaged within the recess, the pin extending outwardly from the side edge; and a knob connected to a free end of the pin; the knob manually operable to selectively move the pin away from the recess and allowing a free end of an actuator to slide along the side edge and return the pin into an engagement with the recess and preventing the free end to slide along the side edge; the free end of the actuator being rotationally connectable to the pin.

Embodiment 70

A latch operating device, comprising: an operating shaft; a rotational connection between one end of the operating shaft and a stationary structure; a force receiving element, the force receiving element mounted on the operating shaft for a rotational movement therewith; an operating lever, the operating lever mounted on the operating shaft for the rotational movement therewith; and an operating spring, the operating spring having one end connected to the operating lever, the operating spring having another end thereof connected to a cable; the operating spring pulling the cable in one direction when the operating shaft rotates due to a force received by the force receiving element and releasing the cable to move in an opposite direction when the force is no longer received by the force receiving element.

Embodiment 71

The latch operating device of embodiment 70, further comprising: a link, the link disposed between and connected to the operating spring and the cable, the link having a slot through a thickness of the link, the operating spring connected to the cable through the link; another lever, the another level passed through the slot; and another rotational connection between one end of the another lever and the stationary structure; the another lever rotatable in one direction when the operating spring pulls the cable, the lever rotatable in an opposite direction when the operating spring releases the cable; the another lever rotatable in the opposite direction when a force is applied to an opposite end of the another lever.

Embodiment 72

A ramp assembly, comprising: a support, the support defining each of a vertical axis and a horizontal axis during operation of the ramp assembly; a ramp, the ramp coupled to the support during the operation of the ramp assembly, the ramp configured to support an passenger thereon; and an actuator mechanism, the actuator mechanism being coupled to at least one of the support, the ramp, a power source and a controller, the actuator mechanism configured, in a response to a control signal from the controller or in a response to a manual force, to rotate the ramp about the vertical axis between a stowed position and a deployed position and to rotate the ramp about the horizontal axis between the deployed position and a ground engaging position.

Embodiment 73

A method of boarding a mobility challenged individual into a vehicle or alighting the mobility challenged individual therefrom, the method comprising: rotating, with a first actuator mechanism, a ramp from a stowed position into a deployed position; rotating, with a second actuator mechanism, the ramp from the deployed position into a ground engaging position; and using, by the mobility challenged individual, an inclined surface of the ramp being disposed in the ground engaging position to ingress or alight an interior of the vehicle.

Embodiment 75

The method of embodiment 73, further comprising: rotating, with the second actuator mechanism, the ramp from the ground engaging position into the deployed position; and rotating, with the first actuator mechanism, the ramp from deployed position into the stowed position.

Embodiment 76

The method of embodiment 73, further comprising selectively latching and unlatching the ramp in the deployed position.

Embodiment 77

The method of embodiment 73, wherein selectively latching and unlatching the ramp in the deployed position comprises rotating a latch between a retracted and deployed positions.

Embodiment 77

The method of embodiment 76, further comprising temporarily retracting the latch into the retracted position and rotating the ramp from the deployed position into a position external to the vehicle.

Embodiment 78

The method of embodiment 73, wherein selectively latching and unlatching the ramp in the deployed position comprises engaging a latch with a lever pivotally mounted on the ramp and disengaging the latch with an actuator connected to the lever.

Embodiment 79

The method of embodiment 73, further comprising selectively latching and unlatching the ramp in the stowed position.

Embodiment 80

The method of embodiment 73, further comprising selectively latching and unlatching the ramp in each of the stowed and deployed positions.

Embodiment 82

The method of embodiment 73, wherein rotating the ramp from the deployed position into a ground engaging position comprises unfolding, with a counter balance device, an outer ramp portion from an inner ramp portion.

Embodiment 83

A method of boarding mobility challenged individuals into a vehicle or alighting the mobility challenged individuals therefrom, the method comprising: rotating, with a first actuator mechanism, a ramp from a stowed position into a deployed position; rotating, with a second actuator mechanism, the ramp from the deployed position into a ground engaging position; unfolding an inner ramp portion and an outer ramp portion during rotating the ramp from the deployed position into a ground engaging position; and using, by the mobility challenged individuals, an inclined surface of the ramp being in the ground engaging position to ingress or egress an interior of the vehicle, the inclined surface provided by the unfolded inner and outer ramp portions.

Embodiment 83

The method of embodiment 82, further comprising selectively latching and unlatching the inner and outer ramp portions therebetween when the ramp in one of the deployed position, the stowed position and during a movement of the ramp between the stowed and deployed positions.

Embodiment 84

The method of embodiment 82, wherein rotating the ramp from the deployed position into the ground engaging position comprises manually overriding the second actuator mechanism.

In the present disclosure, many features are described as being optional, e.g. through the use of the verb "may". For the sake of brevity and legibility, the present disclosure does not explicitly recite each and every permutation that may be obtained by choosing from the set of optional features. However, the present disclosure is to be interpreted as explicitly disclosing all such permutations. For example, an apparatus described as having three optional features may be embodied in seven different ways, namely with just one of the three possible features, with any two of the three possible features or with all three of the three possible features.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as fat may, typically, have rough and/or nonlinear features. Moreover, sharp angles that are illustrated may be rounded. Thus, the regions i-lustrated in the figures are schematic in nature and their shapes are not intended to illustrate the precise shape of a region and are not intended to limit the scope of the present claims. Although many figures illustrate connections between various components by way of fasteners, components may be connected with ad or components may be connected by welding or fusing. It will be understood that variations, modifications, equivalents and substitutions for components of the specifically described exemplary embodiments of the disclosure may be made by those skilled in the art without departing from the spirit and scope of the disclosure as set forth in the appended claims.

Any element in a claim that does not explicitly state "means for" performing a specified function, or "steep for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112', 6.

Furthermore, the Abstract is not intended to be limiting as to the scope of the claimed subject matter and is for the purpose of quickly determining the nature of the claimed subject matter.

What is claimed is:

1. A latch assembly, comprising:
a latch mounting element, the latch mounting element at least including a housing with a peripheral wall defining a hollow interior and an open end, and a mounting flange extending outwardly from the peripheral wall;
a latch, the latch at least including:
a latch shaft rotatably attached to the peripheral wall, one or two springs configured to encircle a portion of the latch shaft, and
one or two latch flanges having a proximal edge attached to the latch shaft,
the latch being attached to a distal end of the one or two latch flanges for a rotation with the latch shaft between a retracted position where the latch is disposed within the hollow interior due to a bias force from one or two springs and a deployed position where the latch extends through the open end past an edge of the peripheral wall.

2. The latch assembly of claim 1, wherein the mounting flange comprises two mounting flanges, each mounting flange extending outwardly from the peripheral wall.

3. The latch assembly of claim 1, further comprising a cable arm attached to the latch shaft for the rotation therewith and an actuating cable attached to the latch to rotate the latch into the deployed position and allow the rotation of the latch into the retracted position.

4. The latch assembly of claim 3, further comprising a connection with a latch operating device, the connection configured to allow the latch operating device to rotate the latch from the retracted position into the deployed position.

5. The latch assembly of claim 4, further comprising the latch operating device, the latch operating device comprising:
   a shaft mounted for a rotational movement;
   a force receiving element, the force receiving element mounted on the shaft for the rotational movement therewith;
   a lever, the lever mounted on the shaft for the rotational movement therewith; and
   an operating spring, the operating spring having one end connected to the lever, the operating spring having another end thereof connectable to a cable.

6. The latch assembly of claim 5, further comprising the cable, wherein the operating spring configured to pull the cable in one direction when the shaft rotates due to a force received by the force receiving element, the operating spring being further configured to allow the cable to move in an opposite direction when the force is no longer received by the force receiving element.

7. The latch assembly of claim 5, further comprising a ramp support, the ramp support defining each of a vertical axis and a horizontal axis, the shaft attached for the rotational movement to a stationary portion of the ramp support.

8. The latch assembly of claim 7, further comprising a ramp, the ramp configured to attach to the ramp support, the ramp configured to rotate about the vertical axis and about the horizontal axis.

9. The latch assembly of claim 7, further comprising a latch release, the latch release comprising link attached to the operating spring, an elongated slot through a thickness of the link and a latch release lever rotationally attached to a stationary portion of the ramp support and passed through the elongated slot.

10. The latch assembly of claim 1, further comprising a latching and release mechanism, the latching and release mechanism comprising:
   a mounting element, the mounting element comprising two edge notches;
   a first lever comprising a first latch engaging portion aligned with one edge notch from the two edge notches, the first lever rotatable, in a first rotational connection with the mounting element between a first latched position and a first unlatched position;
   a first spring, the first spring biases the first lever into the first latched position;
   a second lever comprising a second latch engaging portion aligned with another edge notch from the two edge notches, the second lever rotatable in a second rotational connection with the mounting element between a second latched position and a second unlatched position;
   a second spring, the second spring biases the second lever into the second latched position; and
   a handle mounted for a slidable movement about the mounting element, the handle further mounted in a rotational connection with each of the first lever and the second lever, the handle configured to move the first lever into the first unlatched position and move the second lever into the second unlatched position.

11. The latch assembly of claim 1, further comprising a latching and release mechanism, the latching and release mechanism comprising:
   a notch;
   a lever comprising a latch engaging portion aligned with the notch, the lever rotatable, in a rotational connection between a latched position and an unlatched position;
   a spring, the spring configured to bias the lever into the latched position; and
   a handle, the handle in a rational connection with the lever, the handle configured to move the lever into the unlatched position.

12. The latch assembly of claim 1, wherein the one or two latch flanges comprise two latch flanges.

13. The latch assembly of claim 12, wherein the one or two springs comprise two springs, each spring from two springs being disposed at adjacent a respective latch flange from the two latch flanges.

14. The latch assembly of claim 1, wherein the one or two springs comprise one or more torsional springs.

15. The latch assembly of claim 1, further comprising a stop being disposed within the hollow interior, the stop being configured to contact the latch in the retracted position.

16. The latch assembly of claim 1, further comprising a cover configured to close the open end, the cover at least including a slot to allow a passage of the latch during movements between retracted and deployed positions.

17. A latch assembly, comprising:
   a latch, the latch comprising:
      a housing, the housing comprises a peripheral wall defining a hollow interior and an open end, the peripheral wall comprises a cable access,
      a latch shaft, the latch shaft mounted for a rotation within the hollow interior,
      a latch lever, the latch lever attached to the latch shaft for the rotation therewith between a retracted position where the latch lever is disposed within the hollow interior and a deployed position where the latch lever extends through the open end past an edge of the peripheral wall,
      a cable arm attached to the latch shaft opposite the latch lever, and
      two latch springs, each latch spring from the two latch springs configured to encircle a portion of the latch shaft at each end of the latch lever, the each latch spring configured to bias the latch lever into the retracted position;
   a cable, the cable comprising one end thereof attached to the cable arm;
   a latch operating mechanism, the latch operating mechanism comprising:
      a shaft mounted for a rotational movement,
      a force receiving element, the force receiving element mounted on the shaft for the rotational movement therewith, an operating lever, the operating lever mounted on the shaft for the rotational movement therewith, and an operating spring, the operating spring having one end connected to the operating lever, the operating spring having another end thereof connectable to an opposite end of the cable, the latch operating mechanism configured to tension the cable in a response to a rotation of the shaft in a first direction and to rotate the latch lever into the deployed position; and a latching and release mechanism, the latching and release mechanism comprising:

a lever comprising a latch engaging portion, the lever rotatable, in a rotational connection between a latched position and an unlatched position, a spring, the spring biases the lever into the latched position, and a handle, the handle being in a rotational connection with the lever, the handle configured to move the lever into the unlatched position.

18. The latch assembly of claim 17, further comprising a ramp assembly with a support and a ramp mounted on the support for a rotation between a stowed position and a deployed position, the latch assembly being disposed remotely from the ramp assembly, the latch operating mechanism coupled to the support, the latching and release mechanism attached to an edge of the ramp.

* * * * *